(12) United States Patent
Abaitancei et al.

(10) Patent No.: US 10,794,370 B2
(45) Date of Patent: Oct. 6, 2020

(54) THERMAL HYDRAULIC PROPULSION SYSTEM

(71) Applicant: A & A International, LLC, Chicago, IL (US)

(72) Inventors: Horia Abaitancei, Brasov (RO); Cornel Mihai, Satu Mare (RO); Stefan Ioana, Germantown, MD (US)

(73) Assignee: A & A International, LLC, Chicago, IL (US)

( * ) Notice: Subject to any disclaimer, the term of this patent is extended or adjusted under 35 U.S.C. 154(b) by 0 days.

(21) Appl. No.: 16/355,645

(22) Filed: Mar. 15, 2019

(65) Prior Publication Data

US 2019/0211809 A1    Jul. 11, 2019

Related U.S. Application Data

(63) Continuation-in-part of application No. PCT/US2017/058883, filed on Oct. 27, 2017, which
(Continued)

(30) Foreign Application Priority Data

Oct. 27, 2017    (RO) ............................. A/2017/00883

(51) Int. Cl.
| | |
|---|---|
| *F03G 7/00* | (2006.01) |
| *F15B 21/12* | (2006.01) |
| *F15B 1/02* | (2006.01) |
| *B60K 17/356* | (2006.01) |
| *B60K 7/00* | (2006.01) |

(Continued)

(52) U.S. Cl.
CPC .............. *F03G 7/00* (2013.01); *B60K 7/0015* (2013.01); *B60K 17/356* (2013.01); *F15B 1/024* (2013.01); *F15B 21/12* (2013.01); *B60K 8/00* (2013.01); *B60K 23/08* (2013.01); *B60K 2015/0638* (2013.01); *F16H 43/02* (2013.01)

(58) Field of Classification Search
CPC ......... F03G 7/00; B60K 7/015; B60K 17/356; F15B 1/024; F15B 21/12
See application file for complete search history.

(56) References Cited

U.S. PATENT DOCUMENTS

| | | | |
|---|---|---|---|
| 3,666,038 | A | 5/1972 | Hudspeth et al. |
| 4,888,949 | A | 12/1989 | Rogers |

(Continued)

FOREIGN PATENT DOCUMENTS

| | | |
|---|---|---|
| CN | 102449303 A | 5/2012 |
| WO | 2010/094118 A1 | 8/2010 |

*Primary Examiner* — Thomas E Lazo
*Assistant Examiner* — Daniel S Collins
(74) *Attorney, Agent, or Firm* — Seed IP Law Group LLP

(57) ABSTRACT

A hydraulic propulsion system converts heat or thermal energy into hydraulic energy, and such hydraulic energy into mechanical work. The hydraulic propulsion system includes a thermal unit, a hydraulic cylinder with pistons and springs mounted therein, one or more hydraulic motors, one or more hydraulic accumulators, and one or more electrical energy generators, as well as a plurality of flow control valves to control the flow of hydraulic fluid between the various components. The hydraulic propulsion system may be enhanced by a sonic transmission unit including a sonic wave generator.

24 Claims, 33 Drawing Sheets

Related U.S. Application Data is a continuation of application No. 15/731,360, filed on Jun. 1, 2017, now abandoned.

(60) Provisional application No. 62/496,784, filed on Oct. 28, 2016, provisional application No. 62/498,337, filed on Dec. 21, 2016, provisional application No. 62/498,347, filed on Dec. 21, 2016, provisional application No. 62/498,338, filed on Dec. 21, 2016, provisional application No. 62/498,336, filed on Dec. 21, 2016, provisional application No. 62/577,630, filed on Oct. 26, 2017, provisional application No. 62/644,138, filed on Mar. 16, 2018.

(51) Int. Cl.
*B60K 8/00* (2006.01)
*F16H 43/02* (2006.01)
*B60K 15/063* (2006.01)
*B60K 23/08* (2006.01)

(56) References Cited

U.S. PATENT DOCUMENTS

| | | | |
|---|---|---|---|
| 5,101,925 A | 4/1992 | Walker | |
| 5,165,245 A * | 11/1992 | Agrawal | F25J 3/04181 62/646 |
| 6,290,184 B1 * | 9/2001 | Paterro | B64C 39/001 244/171.1 |
| 7,549,499 B2 | 6/2009 | Delaney | |
| 8,616,323 B1 | 12/2013 | Gurin | |
| 9,109,614 B1 * | 8/2015 | Fong | F15B 21/042 |
| 2009/0008171 A1 | 1/2009 | Hall et al. | |
| 2009/0205892 A1 | 8/2009 | Jensen et al. | |
| 2010/0205960 A1 | 8/2010 | McBride et al. | |
| 2011/0056368 A1 | 3/2011 | McBride et al. | |
| 2014/0261288 A1 | 9/2014 | Coney et al. | |

\* cited by examiner

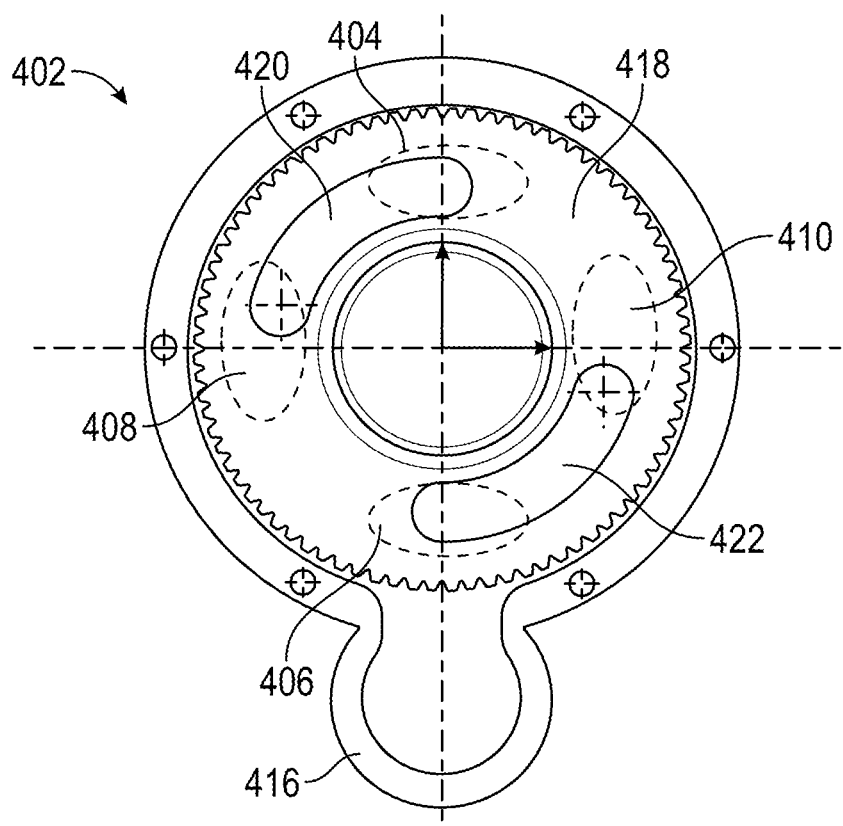
FIG. 7D
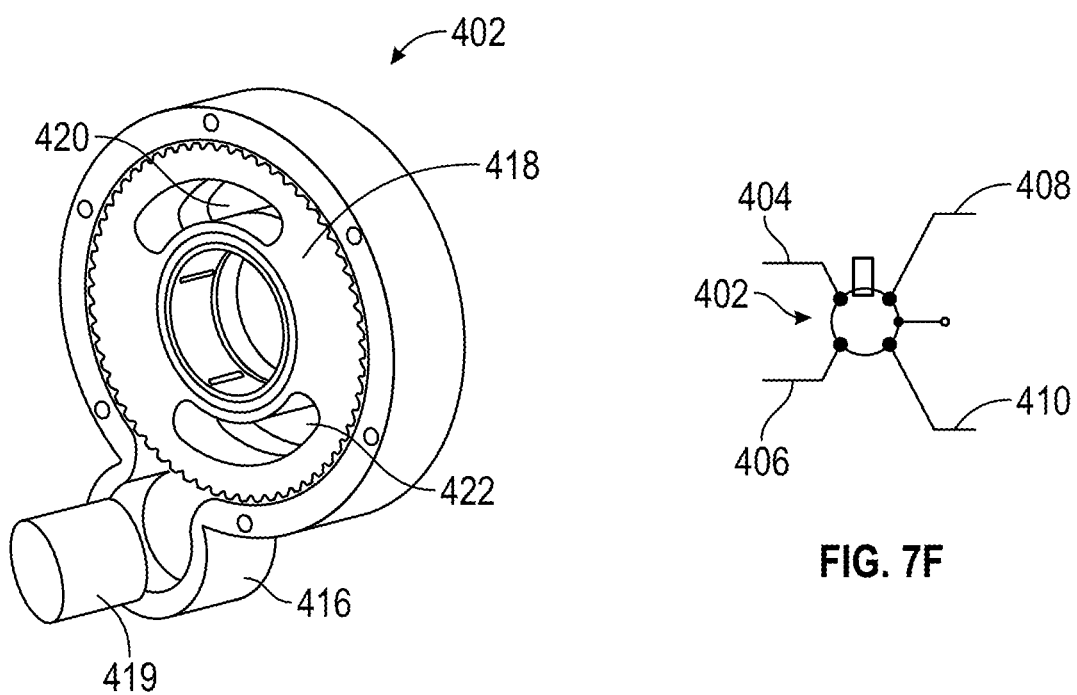
FIG. 7E
FIG. 7F

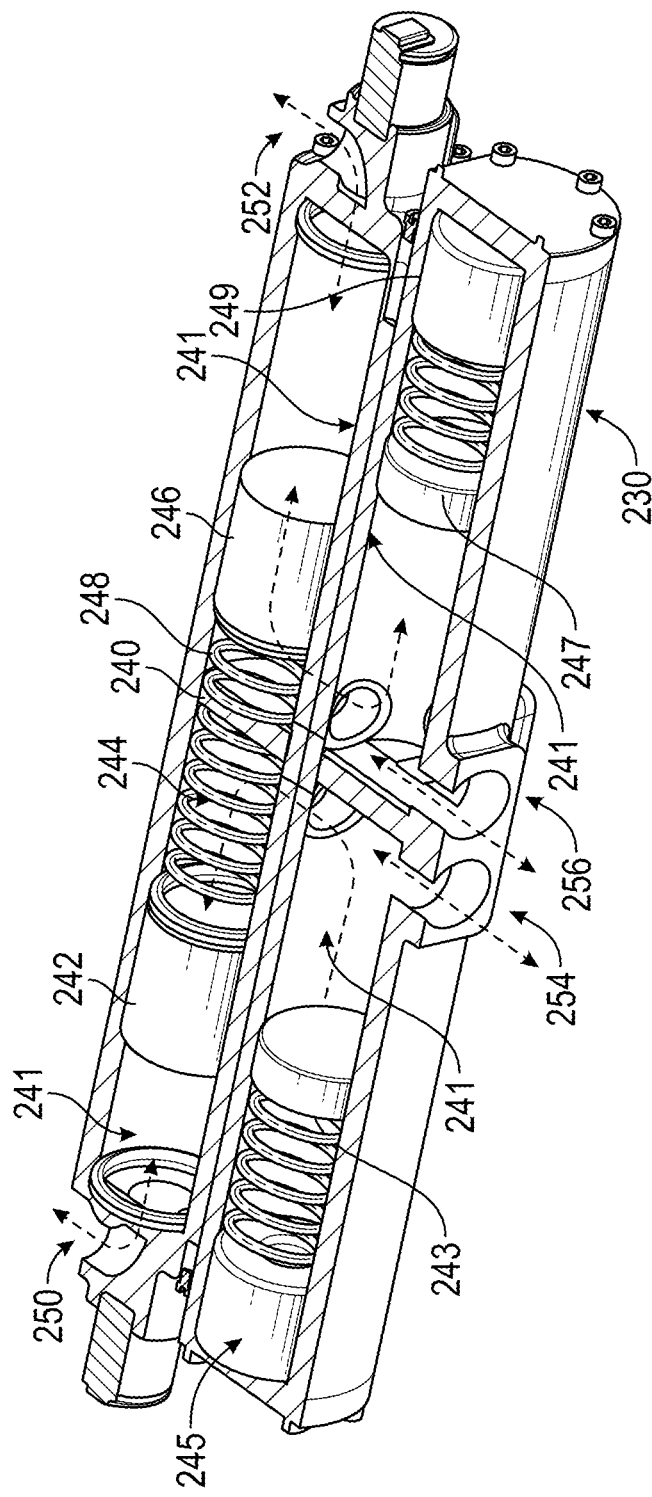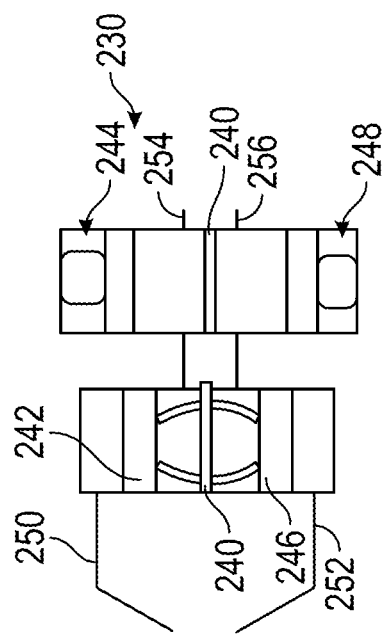
FIG. 8A
FIG. 8B

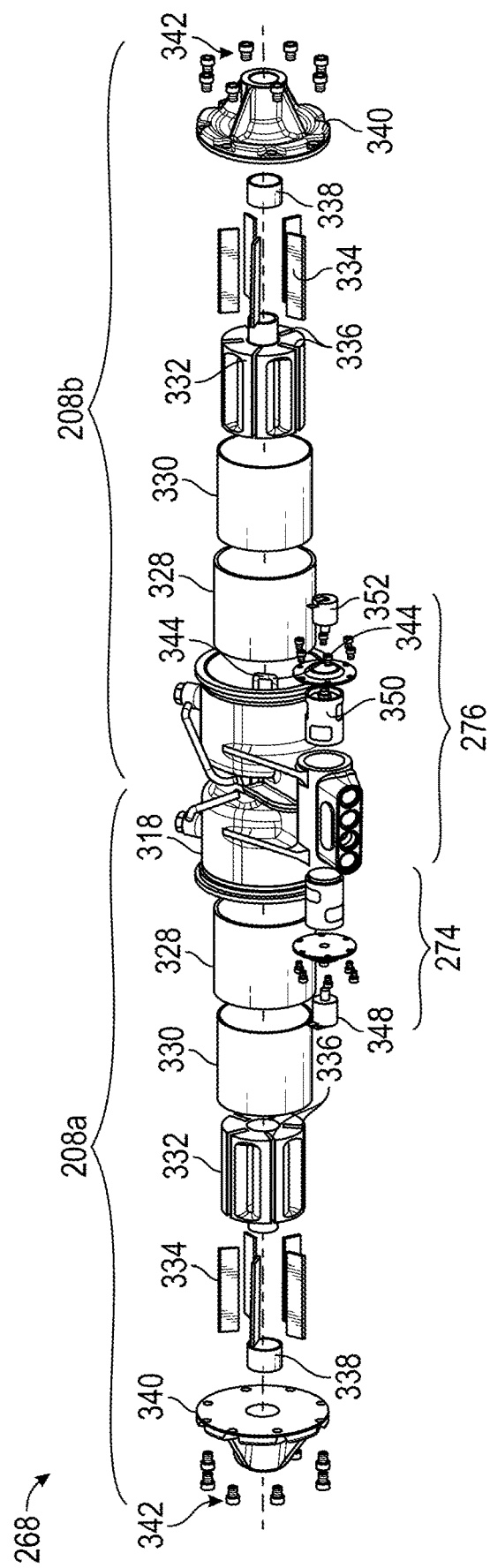

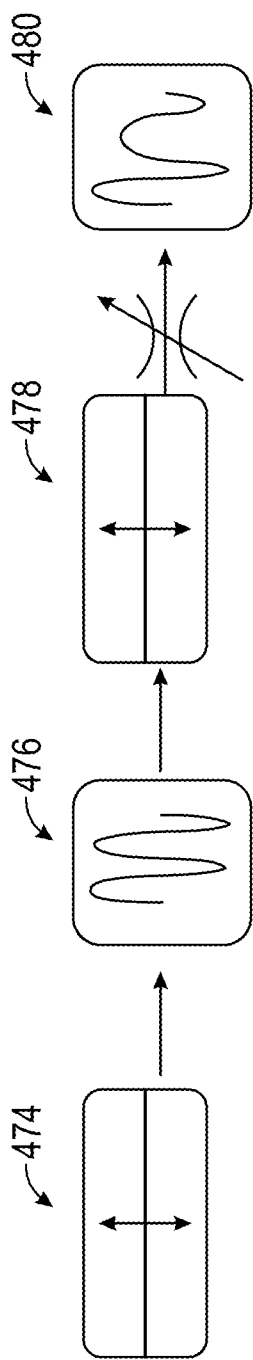
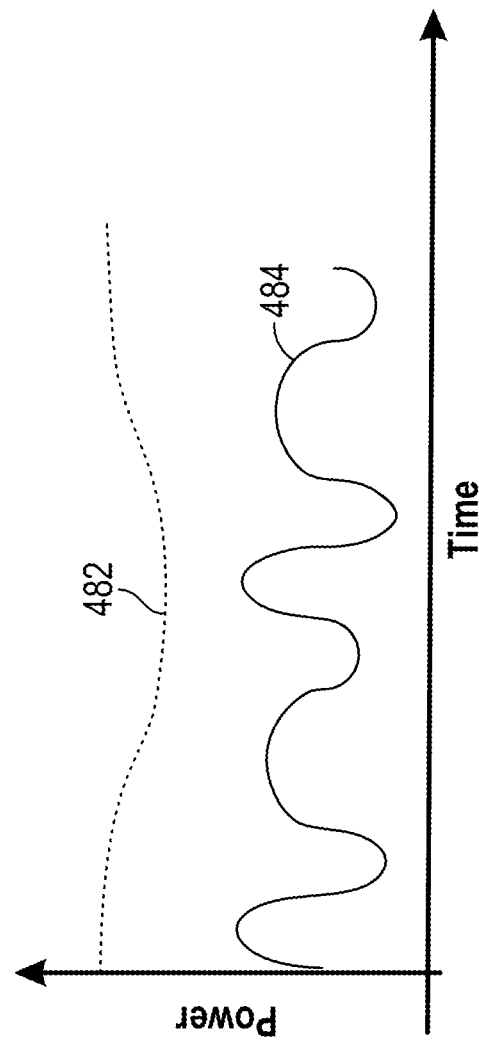
FIG. 24A
FIG. 24B

THERMAL HYDRAULIC PROPULSION SYSTEM

TECHNICAL FIELD

The present disclosure relates generally to hydraulic propulsion systems for generating mechanical work from heat.

BACKGROUND

Description of the Related Art

Relatively simple hydraulic systems have been used for thousands of years and throughout the history of civilization, such as for irrigation and the provision of mechanical power using, for example, water wheels. In modern times, hydraulic systems have become increasingly sophisticated, and are used in a wide variety of industries for a wide variety of purposes. In general, hydraulic systems use liquids, and particularly pressurized liquids, to generate, control, and transmit mechanical power.

In general, hydraulic fluids are liquids selected for their high incompressibility and low compressibility, because increased incompressibility and decreased compressibility generally improves the efficiency of many hydraulic systems. Further, uncontrolled heat and heat changes are often detrimental to hydraulic systems, because they can either destroy or accelerate the deterioration of many hydraulic systems. Additionally, uncontrolled "fluid hammer," "water hammer," and other sudden pressure surges and hydraulic shocks are also often detrimental to many hydraulic systems, because they can either destroy or accelerate the deterioration of the hydraulic systems.

Existing propulsion systems for wheeled vehicles include internal combustion engines, which are appealing due to power density and supporting mobility.

Existing propulsion systems also include hydraulic hybrid systems, which are appealing in comparison to electrical hybrid systems due to the elimination of complicated or expensive materials, which are needed for electrical hybrid systems (such as those required for batteries). However, hydraulic hybrid systems also have drawbacks. For example, hydraulic hybrid systems are associated with noise, size, and complexity.

Existing propulsion systems also include battery-powered electric vehicles, which are appealing due to the absence of tailpipe emissions, production of instant torque, and smoother acceleration than conventional internal combustion engines, as well as reduced noise. However, battery-powered electric vehicles also have drawbacks, including the need to establish charging infrastructure, relatively short driving ranges and low top speeds, limited battery lifetime, and temperature sensitivity.

Existing propulsion systems also include fuel cell vehicles, which are appealing due to the reduction of toxic byproducts, relatively high power density, absence of tailpipe emissions, and relatively low maintenance costs. However, fuel cell vehicles also have drawbacks, including limited fueling infrastructure, costs of production, and potential safety concerns surrounding hydrogen fuel.

Existing propulsion systems also include external combustion engines such as sterling and steam engines, which are appealing due to the flexibility of fuel types, reduced noise, and efficiency. However, external combustion engines also have drawbacks, including size and scalability of the engines.

Existing propulsion systems also include hybrid electric vehicles, which are appealing due to reduced emissions compared to traditional internal combustion engines, and the capacity for regenerative braking. However, hybrid electric vehicles also have drawbacks, including increased mass and higher costs.

There is a continuing need in the art for improved propulsion systems that overcome limitations that have been traditionally associated with such existing propulsion systems.

BRIEF SUMMARY

Traditional engines for automobiles and other wheeled vehicles include internal combustion engines, hydraulic hybrid systems, battery-powered electric systems, fuel cell systems, external combustion systems, and hybrid electric systems. The thermal hydraulic systems described herein are more efficient than such traditional systems, in part because they omit many of the mechanical and moving components, such as the engine and the hydraulic pump, used to operate such systems. The thermal hydraulic systems described herein use external combustion and provide fuel flexibility. The external combustion portion of this thermal hydraulic system has an efficiency of approximately 70% (i.e., approximately 30% loss occurs in this portion of the system). The fuel flexibility of the thermal hydraulic systems described herein enables the thermal hydraulic systems to use any heat source, including the combustion of solid, liquid, or gaseous fuels, such as gasoline, diesel, natural gas, coal, wood, methane, kerosene, ethanol fuel, compressed bio-methane, hydrogen, biofuels, solar energy, electrical energy, waste from industrial processes, and the like. Additionally, the thermal hydraulic systems described herein are low emissions, low cost, and utilize fluid or hydraulic power, which provide high power density, controllability, and architecture flexibility. The fluid power portion of this thermal hydraulic system has an efficiency of approximately 70% (i.e., approximately 30% loss occurs in this portion of the system). Since the external combustion portion of the thermal hydraulic system and the fluid power portion of the thermal hydraulic system are the only two portions of the thermal hydraulic system creating efficiency losses, the total efficiency is approximately 49% (i.e., 70% external combustion efficiency multiplied by 70% fluid power efficiency). This compares to about 25% total efficiency for internal combustion engine vehicles, when measured in the same way. Internal combustion engine vehicles have many more internal components, each of which contributes additional inefficiencies to the total system efficiency, thereby lowering the total system efficiency. A thermal hydraulic pressure wave-based propulsion system may be summarized as including: a thermal unit including a heat exchanger thermally coupled to a heat source and to a first conduit carrying a dilating hydraulic fluid, wherein the heat exchanger exchanges heat between the heat source and the dilating hydraulic fluid, the first conduit having a first inlet and a first outlet; an integrated hydraulic power and control unit including a hydraulic motor hydraulically coupled to a mechanical device and to a second conduit carrying a working hydraulic fluid, wherein the hydraulic motor transfers hydraulic energy from the working hydraulic fluid to mechanical power the mechanical device, the second conduit having a second inlet and a second outlet; and a sonic transmission unit including: a first intermediate conduit having a third inlet and a third outlet; a second intermediate conduit having a fourth inlet and a fourth outlet; a sonic wave generator including a first flow control valve having a first position that hydraulically couples the first outlet to the third inlet and the first inlet to the fourth outlet, and the first flow control valve having a second position that hydraulically couples the first outlet to the fourth outlet and the first inlet to the third inlet; and a sonic wave converter valve including a second flow control valve having a first position that hydraulically couples the second outlet to the fourth inlet and the second inlet to the third outlet, and the second flow control valve having a second position that hydraulically couples the second outlet to the third outlet and the second inlet to the fourth inlet.

The first flow control valve may be locked to the second flow control valve so that the first and second flow control valves are either both in their respective first positions or both in their respective second positions. The mechanical device may be a wheel, wherein the propulsion system further comprises a second hydraulic motor hydraulically coupled to a second wheel and to the second conduit, a third hydraulic motor hydraulically coupled to a third wheel and to the second conduit, and a fourth hydraulic motor hydraulically coupled to a fourth wheel and to the second conduit. The dilating hydraulic fluid may have a first coefficient of thermal expansion and the working hydraulic fluid may have a second coefficient of thermal expansion that is lower than the first coefficient of thermal expansion.

The propulsion system may further include a hydraulic accumulator hydraulically coupled to the second conduit.

The propulsion system may further include an electrical energy generator hydraulically coupled to the second conduit.

The propulsion system may further include a hydraulic cylinder having a first end coupled to the first intermediate conduit and a second end opposite the first end coupled to the second intermediate conduit.

The propulsion system may further include: a dividing wall that divides the hydraulic cylinder into a first chamber and a second chamber; a first piston positioned to move within the first chamber; and a second piston positioned to move within the second chamber.

The first piston may separate the dilating hydraulic fluid from the working hydraulic fluid and the second piston may separate the dilating hydraulic fluid from the working hydraulic fluid.

The propulsion system may further include: a first spring coupled to the dividing wall and to the first piston; and a second spring coupled to the dividing wall and to the second piston.

A method of operating a thermal hydraulic pressure wave-based propulsion system may be summarized as including: using a thermal unit to heat a dilating hydraulic fluid within a first conduit coupled to a sonic wave generator, the sonic wave generator including a first flow control valve in a closed position to increase the pressure of the hydraulic fluid in the first conduit; actuating a sonic transmission unit including the sonic wave generator, the actuating of the sonic transmission unit including actuating the first flow control valve to move from the closed position to an open position to generate a pressure wave in a working hydraulic fluid within a second conduit; and using the pressure wave in the working hydraulic fluid to provide energy to an integrated hydraulic power and control unit including a hydraulic motor.

The hydraulic motor may drive a first wheel. The method may further include using the pressure wave to drive a second hydraulic motor and a second wheel, a third hydraulic motor and a third wheel, and a fourth hydraulic motor and a fourth wheel. The dilating hydraulic fluid may have a first coefficient of thermal expansion and the working hydraulic fluid may have a second coefficient of thermal expansion that is lower than the first coefficient of thermal expansion.

The method of operating a thermal hydraulic pressure wave-based propulsion system may further include using the pressure wave to provide energy to a hydraulic accumulator.

The method of operating a thermal hydraulic pressure wave-based propulsion system may further include using the pressure wave to provide energy to an electrical energy generator.

The method of operating a thermal hydraulic pressure wave-based propulsion system may further include using the pressure wave to move a piston within a hydraulic cylinder.

Moving the piston within the hydraulic cylinder may include compressing a spring within the hydraulic cylinder.

Moving the piston within the hydraulic cylinder and compressing the spring within the hydraulic cylinder may include oscillating the piston and the spring within the hydraulic cylinder.

Oscillating the piston and the spring within the hydraulic cylinder may include oscillating the piston and the spring in resonance within the hydraulic cylinder.

The piston may separate the dilating hydraulic fluid from the working hydraulic fluid.

A thermo-hydraulic gravitational energy conversion system may be summarized as comprising: a hydraulic tank hydraulically coupled to a hydraulic pump, the hydraulic pump hydraulically coupled to a check valve, the check valve hydraulically coupled to a first hydraulic valve, the first hydraulic valve hydraulically coupled to a first hydraulic cylinder and to a second hydraulic valve, the first hydraulic cylinder housing a first piston and a first spring, the second hydraulic valve hydraulically coupled to a third hydraulic valve and a fourth hydraulic valve, the third hydraulic valve hydraulically coupled to a second hydraulic cylinder and to a fifth hydraulic valve, the second hydraulic cylinder housing a second piston that supports a weight, the fifth hydraulic valve hydraulically coupled to a heat exchanger, the fourth hydraulic valve hydraulically coupled to a hydraulic motor and to a third hydraulic cylinder, the third hydraulic cylinder housing a third piston and a second spring, the third piston mechanically coupled to a rod, the rod mechanically coupled by a rotational joint to a lever, the lever mechanically coupled to a freewheel, the freewheel mechanically coupled to a shaft.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been selected solely for ease of recognition in the drawings.

FIG. 7D is an illustration of a flow control valve of a sonic transmission unit in a hydraulic propulsion system, according to at least one illustrated embodiment.

FIG. 7E is an illustration of a flow control valve of a sonic transmission unit in a hydraulic propulsion system, according to at least one illustrated embodiment.

FIG. 7F is a schematic diagram of a flow control valve of a sonic transmission unit in a hydraulic propulsion system, according to at least one illustrated embodiment.

FIG. 8A is an illustration of a hydraulic cylinder of a sonic transmission unit in a hydraulic propulsion system, according to at least one illustrated embodiment.

FIG. 8B is a schematic diagram of a hydraulic cylinder of a sonic transmission unit in a hydraulic propulsion system, according to at least one illustrated embodiment.

FIG. 12 is an exploded view of an integrated hydraulic power and control unit of a hydraulic propulsion system, according to at least one illustrated embodiment.

FIG. 24A illustrates energy transfers within a hydraulic propulsion system, according to at least one illustrated embodiment.

FIG. 24B illustrates energy transfers within a hydraulic propulsion system, according to at least one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, un-recited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

Overview

Figure 1:
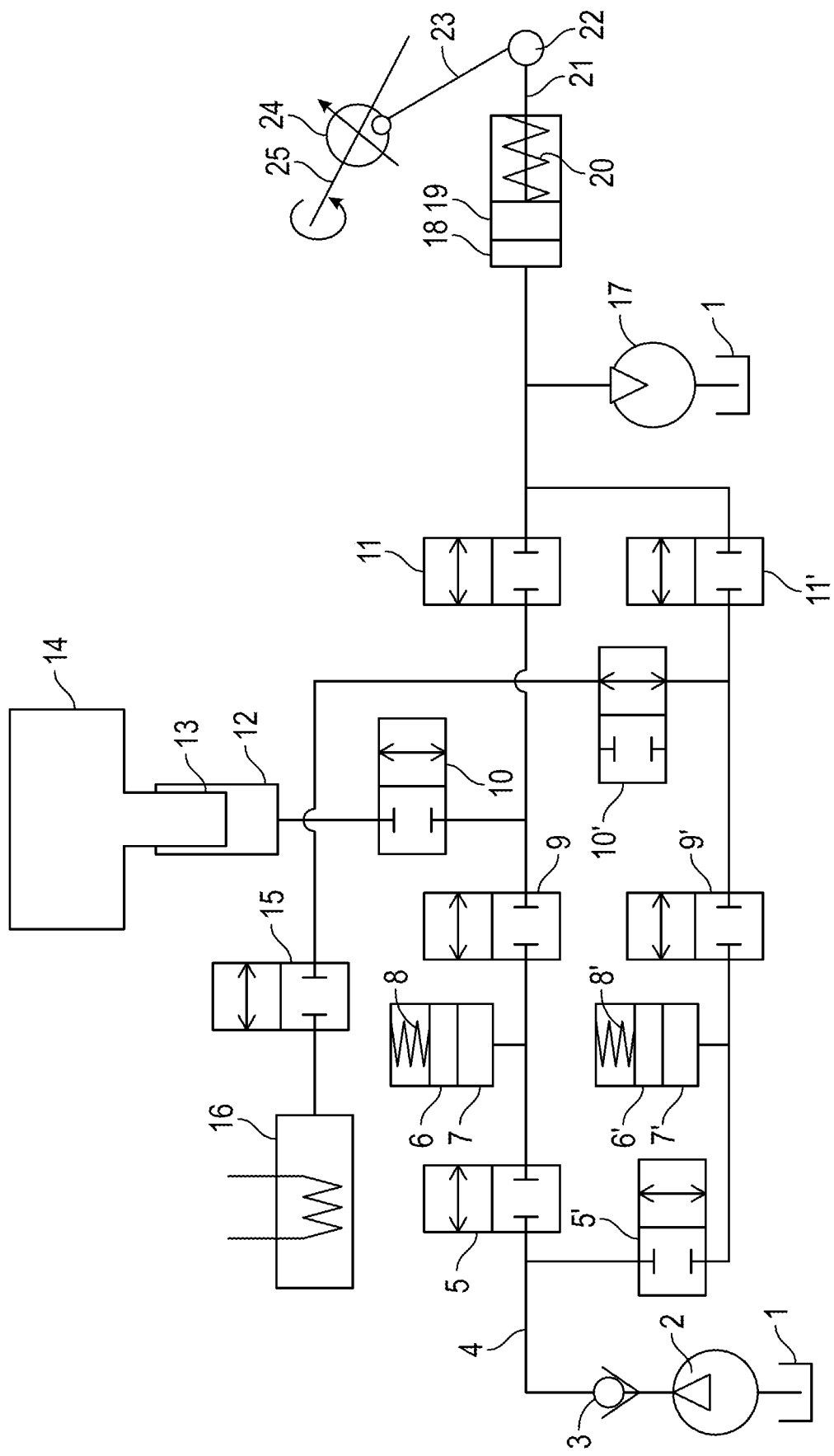
FIG. 1 is a schematic diagram of a thermo-hydraulic gravitational energy conversion system, according to at least one illustrated embodiment.

In one or more embodiments shown in FIG. 1, the thermo-hydraulic gravitational energy conversion system includes a hydraulic tank, a hydraulic pump, a check valve, a plurality of hydraulic valves, a plurality of hydraulic cylinders housing respective pistons and/or springs, a heat exchanger, a hydraulic motor. A piston of one of the hydraulic cylinders may support a weight. A piston of another one of the hydraulic cylinders may be mechanically coupled to a rod, a rotational joint, a lever, a freewheel, and/or a shaft.

The hydraulic liquid taken from the tank 1, pushed by the hydraulic pump 2 through the check valve 3, pipe 4 flows through the 2/2 hydraulic valve 5, enters cylinder 7 pushing piston 6 against the resistance of the spring 8, that can be a mechanical, pneumatic or combination of these, by entrapping compressed gas (nitrogen) in the enclosure of the mechanical spring 8. The 2/2 directional control valves (DCV) 9, 10 and 11 keeps enclosed a quantity of liquid. DCV 10 opens and closes the connection to the hydraulic cylinder 12, containing the piston 13 that support the weight 14. DCV 15 controls the hydraulic connection to the heat exchanger 16. The hydraulic motor 17 is driven by the flow arriving from DCV 11 and 11'. Another possibility to use the controlled flow by DCVs 11 and 11' is entering the hydraulic cylinder 18 where a piston 19 pushes a spring 20 and, using the rod 21, a lever 23, connected by the rotational joint 22. The lever 23 rotates an freewheel 24 that generates the rotational displacement of the mechanical shaft 25.

The flow provided by pump 2, flows through DCV 5 and fills the cylinder 7 by pushing the spring 8 using piston 9, in its extreme position. DCV 9 is closed during the filling process of cylinder 7. By closing DCV 5 and opening DCV 9 and 10, the pressure created by the weight 14 and piston 13 is spread on the constant volume liquid entrapped between DCV 5, DCV 11 and the hydraulic cylinder 7. Closing DCV 10 and opening DCV 11, the pressurized liquid will flow through DCV 11 to power the hydraulic motor 17 or the piston 18 inside the hydraulic cylinder 18. During the emptying process, DCV 10 is closed and the spring 8 of hydraulic cylinder 7 expands, creating the displaced volume of liquid necessary to flow through the hydraulic motor 17 or inside the hydraulic cylinder 18. After closing DCV 11 and 9, DCV 10 opens and transfer the pressure to the fluid entrapped between DCV 9 and 11. In the same time with DCV 9 closed, DCV 5 opens and the flow provided by the pump 2 enters the hydraulic cylinder 7 and compress the spring 8 using piston 6. When the piston reaches the extreme position with spring 8 compressed at maximum displacement, DCV 5 closes, DCV 9 opens and pressure is distributed among the whole quantity of fluid entrapped and the running cycle is restarted.

In order to assure a more continuous flow, it is considered a second branch marked by the components 5', 6', 7', 8', 9', 10', 11' having the same role and functionality like components 5-11, working phase shifted. The second branch comprising of components 5'-11' branch may feed in the same manner as 5-11 do, a second hydraulic cylinder 18 that works in the same principle and powering the shaft 25. In order to compensate leakage or unwanted displacement of the mass 14, the DCV 15 opens the connection to the heat exchanger 16 where the heated liquid expand thermally and pushes the weight against gravity. During this process, DCV 10 is closed.

Figure 2A:
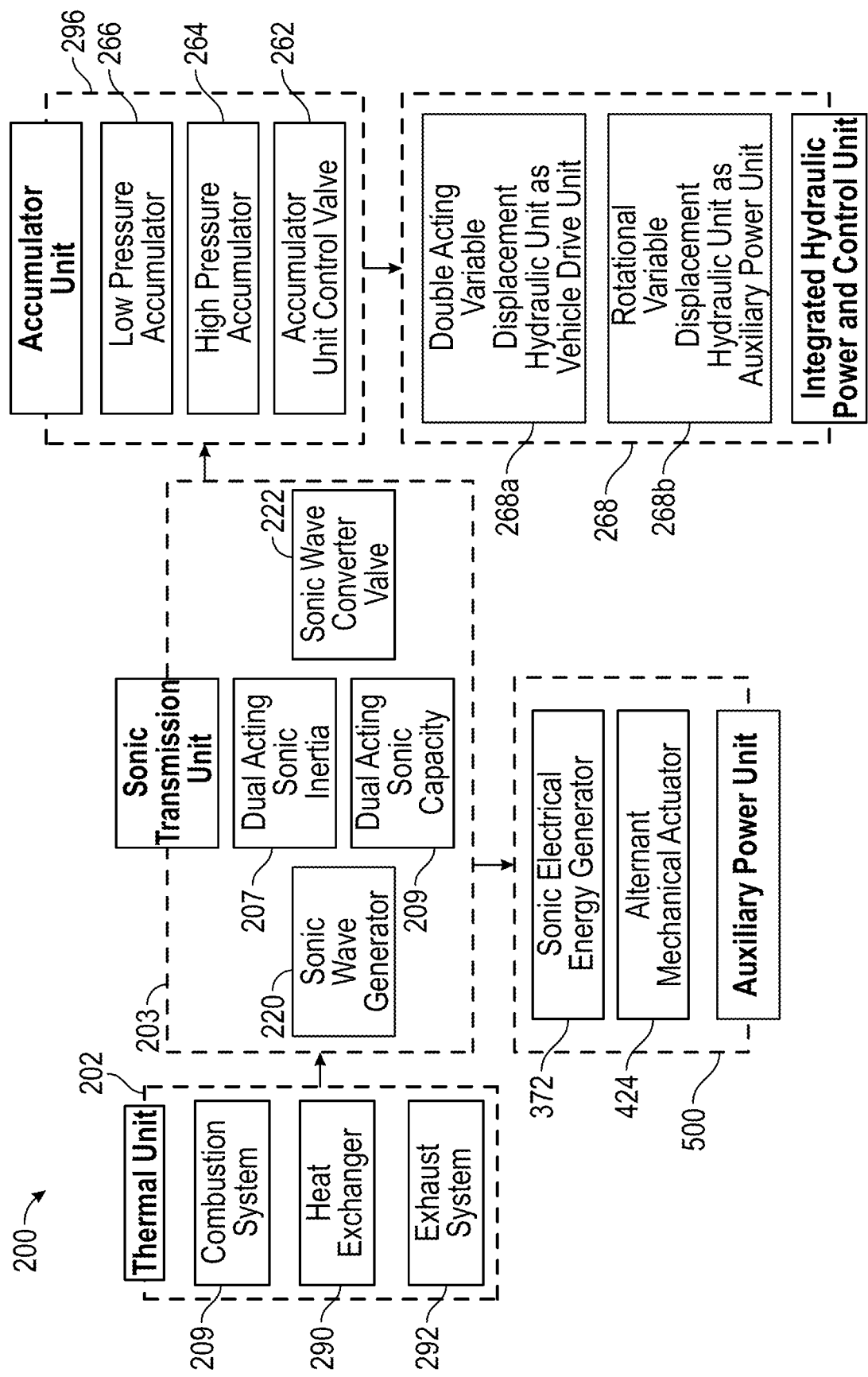
FIG. 2A is a schematic diagram of a hydraulic propulsion system, according to at least one illustrated embodiment.

FIG. 2A shows a schematic diagram of a hydraulic propulsion system 200. Hydraulic propulsion system 200 includes five primary sub-systems, referred to herein as a thermal unit 202, a sonic transmission unit 203, an integrated hydraulic power and control unit 268, an accumulator unit 296, and an auxiliary systems power unit 500. The thermal unit 202 is used to heat a hydraulic fluid and is coupled to the sonic transmission unit 203 to provide heated hydraulic fluid to the sonic transmission unit 203. The sonic transmission unit 203 is coupled to the auxiliary systems power unit 500, to the accumulator unit 296, and to the integrated hydraulic power and control unit 268 to transfer energy from the thermal unit 202 to the auxiliary systems power unit 500, the accumulator unit 296, and the integrated hydraulic power and control unit 268. The accumulator unit 296 is coupled to the integrated hydraulic power and control unit 268. The accumulator unit 296 stores energy from the sonic transmission unit 203 and provides hydraulic power to the integrated hydraulic power and control unit 268. Any of the hydraulic components described herein as being coupled to one another may also be referred to as "hydraulically coupled" to one another.

Together, the thermal unit 202 and the sonic transmission unit 203 are used to convert thermal energy directly into hydraulic energy and to transfer the hydraulic energy through waves propagated through a hydraulic fluid to other components of the hydraulic propulsion system 200, where the hydraulic energy is used to perform mechanical (or electrical) work. Such energy transfer by waves propagated through a hydraulic fluid may be referred to herein as "sonic" energy transfer.

As seen in FIG. 2A, the thermal unit 202 includes a combustion system 205, a heat exchanger 290, and an exhaust system 292. The thermal unit 202 is described in greater detail in the thermal unit section below. As also seen in FIG. 2A, the sonic transmission unit 203 includes a sonic wave generator, which may also be referred to as a first flow control valve 220; a dual-acting sonic inertia unit 207; a dual-acting sonic capacity unit 209; and a sonic wave converter valve, which may also be referred to as a second flow control valve 222. The sonic transmission unit 203 is described in greater detail in the sonic transmission unit section below. As also seen in FIG. 2A, the integrated hydraulic power and control unit 268 is used as either a double-acting vehicle drive unit 268a, or an auxiliary power unit 268b. The integrated hydraulic power and control unit 268 is described in greater detail in the integrated hydraulic power and control unit section below. As also seen in FIG. 2A, the accumulator unit 296 includes an accumulator unit control valve 262, a high-pressure accumulator 264, and a low-pressure accumulator 266. The accumulator unit 296 is described in greater detail in the accumulator unit section below. As also seen in FIG. 2A, the auxiliary systems power unit 500 includes a sonic electrical energy generator 372 and a mechanical actuator 424. The auxiliary power unit 500 is described in greater detail in the auxiliary power unit section below.

Figure 2B:
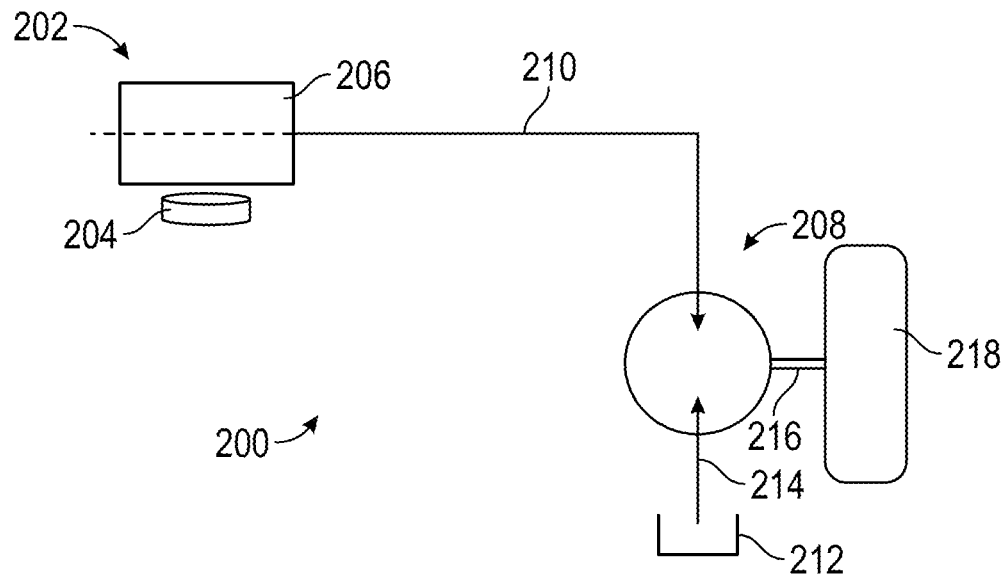
FIG. 2B is another schematic diagram of a hydraulic propulsion system, according to at least one illustrated embodiment.

FIG. 2B is a schematic illustration of the hydraulic propulsion system 200, with some modifications to the implementation illustrated in FIG. 2A. As illustrated in FIG. 2B, the hydraulic propulsion system 200 includes a thermal unit 202, a heat source 204, and a hydraulic fluid reservoir 206 to be heated by the heat source 204. The hydraulic propulsion system 200 also includes a hydraulic motor 208 coupled to the thermal unit 202 by a first hydraulic conduit 210, coupled to a holding reservoir 212 by a second hydraulic conduit 214, and coupled to a wheel 218, a turbine, or other mechanical device to be turned by a shaft 216. Any of the hydraulic conduits described herein may also be referred to as "pipes" or "hydraulic pipes."

When the heat source 204 is used to heat the hydraulic fluid reservoir 206, the pressure of the hydraulic fluid in the hydraulic fluid reservoir 206 increases, initiating a high-pressure wave that travels along the first hydraulic conduit 210 to the hydraulic motor 208. When the pressure wave meets the hydraulic motor 208, the pressure wave drives temporary rotation of the shaft 216 and the wheel 218 by imparting a transient pressure differential to the hydraulic motor 208, and by an action of the hydraulic motor 208 imparts a transient torque to the shaft 216. The relatively high-pressure hydraulic fluid in the first hydraulic conduit 210 flows through the hydraulic motor 208, driving rotation of the shaft 216, until the pressure in the first hydraulic conduit 210 equalizes with the pressure in the second hydraulic conduit 214 and the holding reservoir 212.

Figure 3:
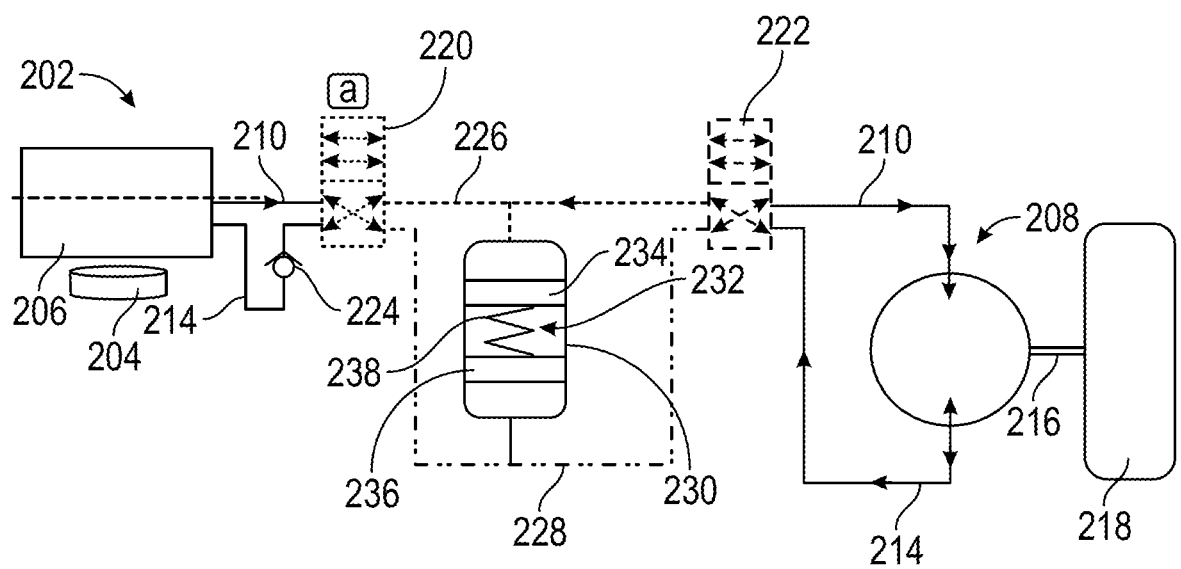
FIG. 3 is another schematic diagram of a hydraulic propulsion system, according to at least one illustrated embodiment.

FIG. 3 is another schematic illustration of the hydraulic propulsion system 200, with some modifications to the implementation illustrated in the preceding figures. As illustrated in FIG. 3, the hydraulic propulsion system 200 does not include the holding reservoir 212, and the second hydraulic conduit 214 returns hydraulic fluid that passes through and exits the hydraulic motor 208 to the hydraulic fluid reservoir 206. In one implementation, the hydraulic fluid passes through a check valve 224 to the hydraulic fluid reservoir 206, where it may be heated again by the heat source 204. Thus, the first hydraulic conduit 210 is a high-pressure hydraulic conduit 210, and the second hydraulic conduit 214 is a low-pressure hydraulic conduit. FIG. 3 also illustrates that the hydraulic propulsion system 200 includes a first flow control valve 220 positioned within both the first hydraulic conduit 210 and the second hydraulic conduit 214, and a second flow control valve 222 positioned within both the first hydraulic conduit 210 and the second hydraulic conduit 214.

As shown in the implementation illustrated in FIG. 3, the hydraulic propulsion system 200 also includes a first intermediate conduit 226 and a second intermediate conduit 228. The first and second flow control valves 220 and 222 are linked to one another so that they move in unison from respective first positions to respective second positions. As shown in FIG. 3, in the respective first positions, the first hydraulic conduit 210 is diverted to flow through the second intermediate conduit 228 (otherwise stated, in which the second intermediate conduit 228 forms an intermediate portion of the first hydraulic conduit 210) and the second hydraulic conduit 214 is diverted to flow through the first intermediate conduit 226 (otherwise stated, in which the first intermediate conduit 226 forms an intermediate portion of the second hydraulic conduit 214). In the respective second positions, the first hydraulic conduit 210 is diverted to flow through the first intermediate conduit 226 (otherwise stated, in which the first intermediate conduit 226 forms an intermediate portion of the first hydraulic conduit 210) and the second hydraulic conduit 214 is diverted to flow through the second intermediate conduit 228 (otherwise stated, in which the second intermediate conduit 228 forms an intermediate portion of the second hydraulic conduit 214).

Whether the first and second flow control valves 220 and 222 are in their respective first or second positions, relatively high-pressure hydraulic fluid flows out of the thermal unit 202 through the first hydraulic conduit 210 and to the hydraulic motor 208 through the first hydraulic conduit 210, and relatively low-pressure hydraulic fluid flows out of the hydraulic motor 208 through the second hydraulic conduit 214 and back to the thermal unit 202 through the second hydraulic conduit 214. Nevertheless, as the first and second flow control valves 220 and 222 are actuated to move between their respective first and second positions, the relatively high-pressure hydraulic fluid of the first hydraulic conduit 210 and the relatively low-pressure hydraulic fluid of the second hydraulic conduit 214 alternate between flowing through the first intermediate conduit 226 and flowing through the second intermediate conduit 228.

As also shown in FIG. 3, the hydraulic propulsion system 200 includes a hydraulic cylinder 230 coupled at a first end thereof to the first intermediate conduit 226 and coupled at a second end thereof to the second intermediate conduit 228. The hydraulic propulsion system 200 also includes a piston assembly 232, including a first piston 234, a second piston 236, and a spring 238 interconnecting the first piston 234 and the second piston 236, housed within the hydraulic cylinder 230. The piston assembly 232 separates the relatively high-pressure hydraulic fluid of one of the first and second intermediate conduits 226 and 228 from the relatively low-pressure hydraulic fluid of the other of the first and second intermediate conduits 226 and 228. As the relatively high- and relatively low-pressure hydraulic fluids alternate between the first and second intermediate conduits 226 and 228, the piston assembly 232 begins to oscillate within the hydraulic cylinder 230.

In some implementations, the entire piston assembly 232 oscillates back and forth within the hydraulic cylinder. In some implementations, the pistons 234 and 236 oscillate back and forth with respect to one another by compression and/or extension of the spring 238. A spring constant or a stiffness of the spring 238 and/or the masses of the pistons 234 and 236 are selected or designed so that the piston assembly 232 oscillates under resonant conditions, or resonates, within the hydraulic cylinder 230. Any of the springs described herein, including the spring 238, can include any suitable elastomeric element or equivalent substitute therefore, including a mechanical helical or disc spring, or a compressed gas.

Figure 4:
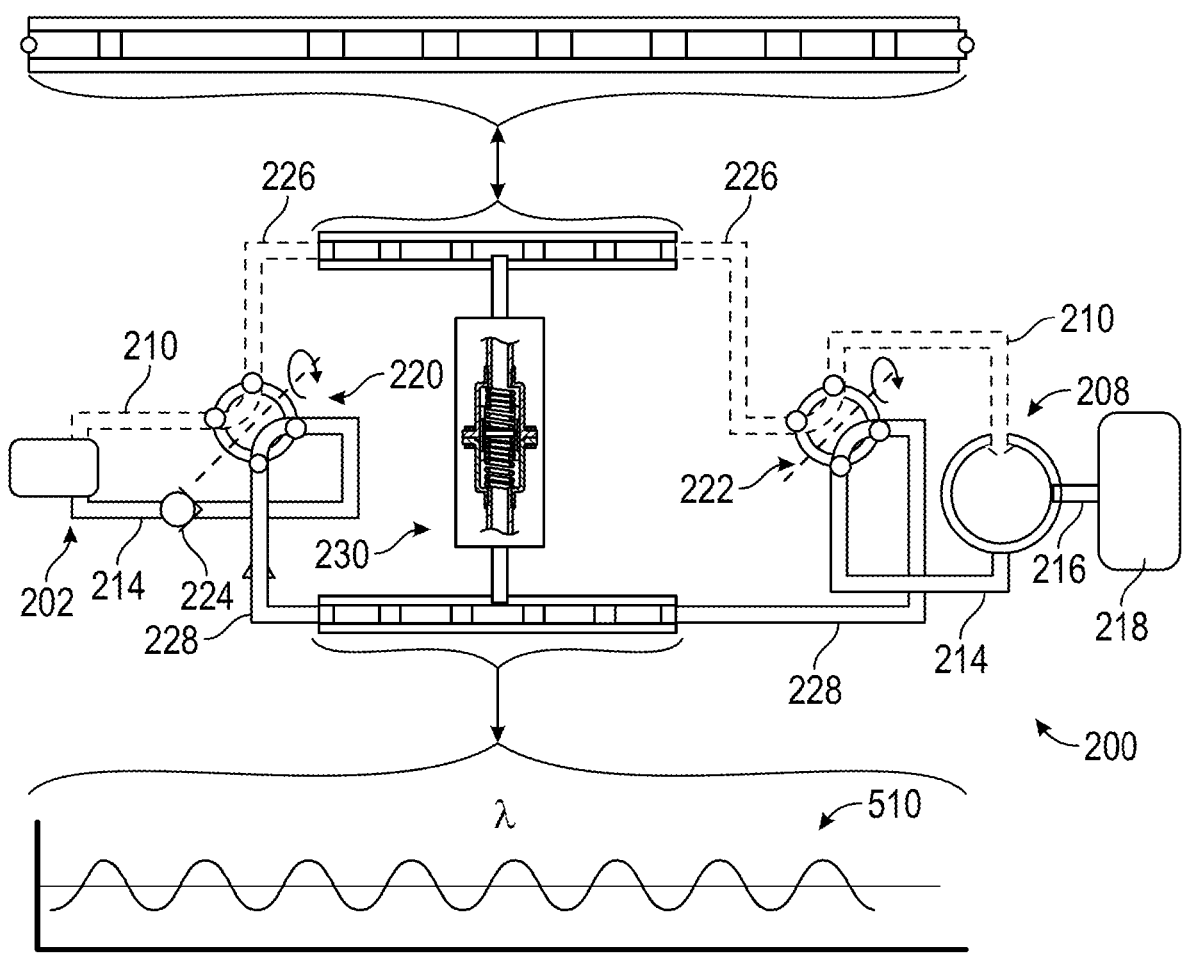
FIG. 4 is another schematic diagram of a hydraulic propulsion system, according to at least one illustrated embodiment.

FIG. 4 is an additional schematic illustration of the hydraulic propulsion system 200, with some modifications to the implementation illustrated in the preceding figures. As illustrated in FIG. 4, the hydraulic propulsion system 200 employs sonic waves, which may also be referred to as hydraulic oscillations or hydraulic waves 510, that travel through and/or resonate within the first and second intermediate conduits 226 and 228, have a wavelength lambda, which corresponds to their frequency, and which corresponds to the rate at which the first and second flow control valves 220 and 222 are opened and closed. In some implementations, the frequency of the waves is between about 5 Hz and about 10,000 Hz. In some more preferred implementations the frequency of the waves is between about 30 Hz and about 50 Hz.

As illustrated in FIG. 4, the hydraulic propulsion system 200 includes the hydraulic cylinder 230 having a piston assembly positioned therein. The movable piston operates as a dividing wall between the first and second intermediate conduits 226 and 228. As the first and second flow control valves 220 and 222 are moved back and forth between their respective first and second positions, and as the relatively high-pressure waves alternate between the first and second intermediate conduits 226 and 228, the movable piston begins to oscillate back and forth within the hydraulic cylinder 230 by compression and/or extension of the springs therein. Spring constants or stiffness of the springs and/or the mass of the movable piston are selected or designed so that the movable piston oscillates under resonant conditions, or resonates, within the hydraulic cylinder 230.

Figure 5:
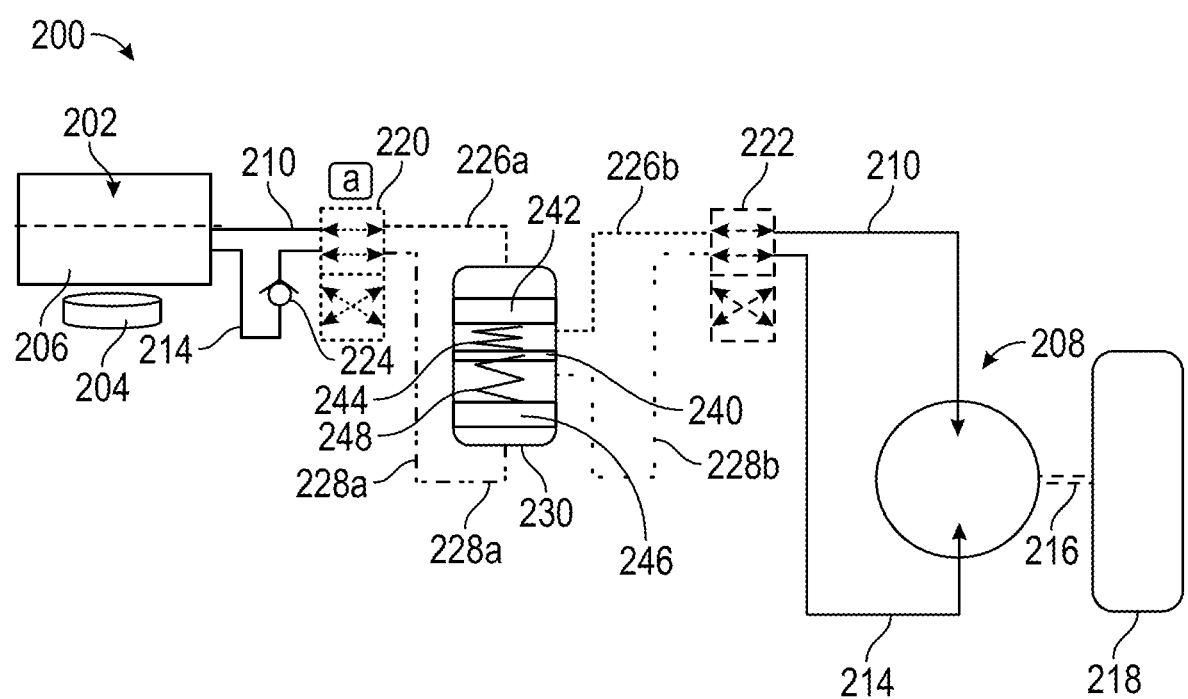
FIG. 5 is another schematic diagram of a hydraulic propulsion system, according to at least one illustrated embodiment.

In another implementation, the piston assembly positioned within the hydraulic cylinder 230 illustrated in FIG. 4 has a structure similar to the corresponding piston assembly positioned within the hydraulic cylinder 230 illustrated in FIG. 5, albeit with some differences. In such an implementation, the piston assembly does not include the first and second pistons 242, 246. Additionally, in such an implementation, the piston assembly replaces the fixed dividing wall 240 with a movable piston, such that the springs 244 and 248 each engage with opposing ends of the hydraulic cylinder 230 and with the movable piston.

FIG. 5 is another schematic illustration of the hydraulic propulsion system 200, with some modifications to the implementation illustrated in the preceding figures. As illustrated in FIG. 5, the hydraulic propulsion system 200 includes a hydraulic cylinder 230 that houses a fixed dividing wall 240. The fixed dividing wall 240 divides the hydraulic cylinder 230 into two distinct and rigid hydraulic chambers. A first one of the chambers houses a first piston 242 interconnected with the fixed dividing wall 240 by a first elastic element or spring 244, and a second one of the chambers houses a second piston 246 interconnected with the fixed dividing wall 240 by a second elastic element or spring 248.

The implementation of the hydraulic propulsion system 200 illustrated in FIG. 5 includes two different hydraulic fluids: a dilating hydraulic fluid, which is selected to have a relatively high compressibility and a relatively high coefficient of thermal expansion (e.g., glycerin, mercury, ethylene glycol, or propylene glycol), and a non-dilating, working hydraulic fluid, which is selected to have a low compressibility and a low coefficient of thermal expansion (e.g., conventional hydraulic fluids and oils, with environmentally friendly water-based solutions commercially available). As illustrated in FIG. 5, the first intermediate conduit 226 is divided into a dilating fluid portion 226a and a working fluid portion 226b separated from the dilating fluid portion 226a by the first piston 242. The second intermediate conduit 228 is divided into a dilating fluid portion 228a and a working fluid portion 228b separated from the dilating fluid portion 228a by the second piston 246.

In the implementation of the hydraulic propulsion system 200 illustrated in FIG. 5, when the heat source 204 is used to heat the hydraulic fluid reservoir 206, the pressure of a dilating hydraulic fluid in the hydraulic fluid reservoir 206 increases, initiating a high-pressure wave that travels along the first hydraulic conduit 210, through the first flow control valve 220 and the dilating fluid portion 226a of the first intermediate conduit 226 to the first chamber of the hydraulic cylinder 230. At the hydraulic cylinder 230, the dilating hydraulic fluid exerts a relatively high pressure against the first piston 242, thereby compressing the spring 244 and initiating a relatively high-pressure wave in the working hydraulic fluid that travels along the working fluid portion 226b of the first intermediate conduit 226, through the second flow control valve 222 and the first hydraulic conduit 210 to the hydraulic motor 208.

The relatively high-pressure wave in the working hydraulic fluid travels through the hydraulic motor 208, as described above, and then along the second hydraulic conduit 214, through the second flow control valve 222 and the working fluid portion 228b of the second intermediate conduit 228 to the second chamber of the hydraulic cylinder 230. At the hydraulic cylinder 230, the working hydraulic fluid exerts a pressure against the second piston 246, thereby extending the spring 248 and initiating a relatively high-pressure wave in the dilating hydraulic fluid that travels along the dilating fluid portion 228a of the second intermediate conduit 228, through the first flow control valve 220, the second hydraulic conduit 214, and the check valve 224, back to the thermal unit 202.

Referring still to FIG. 5, when the first and second flow control valves 220 and 222 are moved from their respective first positions to their respective second positions, and the heat source 204 is used to heat the hydraulic fluid reservoir 206, the pressure of the dilating hydraulic fluid in the hydraulic fluid reservoir 206 increases, initiating a high-pressure wave that travels along the first hydraulic conduit 210, through the first flow control valve 220 and the dilating fluid portion 228a of the second intermediate conduit 228 to the second chamber of the hydraulic cylinder 230. At the hydraulic cylinder 230, the dilating hydraulic fluid exerts a relatively high pressure against the second piston 246, thereby compressing the spring 248 and initiating a relatively high-pressure wave in the working hydraulic fluid that travels along the working fluid portion 228b of the second intermediate conduit 228, through the second flow control valve 222 and the first hydraulic conduit 210 to the hydraulic motor 208.

The relatively high-pressure wave in the working hydraulic fluid travels through the hydraulic motor 208, as described above, and then along the second hydraulic conduit 214, through the second flow control valve 222 and the working fluid portion 226b of the first intermediate conduit 226 to the first chamber of the hydraulic cylinder 230. At the hydraulic cylinder 230, the working hydraulic fluid exerts a pressure against the first piston 242, thereby extending the spring 244 and initiating a relatively high-pressure wave in the dilating hydraulic fluid that travels along the dilating fluid portion 226a of the second intermediate conduit 226, through the first flow control valve 220, the second hydraulic conduit 214, and the check valve 224, back to the thermal unit 202.

Thus, as the first and second flow control valves 220 and 222 are moved back and forth between their respective first and second positions, and as the relatively high-pressure waves alternate between the first and second intermediate conduits 226 and 228, the pistons 242 and 246 each begin to oscillate back and forth within the hydraulic cylinder 230 with respect to the fixed dividing wall 240 by compression and/or extension of the springs 244 and 248, respectively. Spring constants or stiffness of the springs 244 and 248 and/or the masses of the pistons 242 and 246 are selected or designed so that the pistons 242 and 246 oscillate under resonant conditions, or resonate, within the hydraulic cylinder 230.

As the hydraulic fluid flows through the various hydraulic conduits of the hydraulic propulsion system 200, the hydraulic fluid undergoes a thermodynamic cycle. In one implementation, as the hydraulic fluid is heated within a constant volume of the hydraulic fluid reservoir 206, a pressure of the hydraulic fluid therein increases (e.g., from 10 bar to 100 bar). As pressure waves move through the hydraulic propulsion system 200 and the hydraulic fluid actuates the hydraulic motor 208, the volume of the hydraulic fluid increases (e.g., from 1.00 L to 1.01 L) and the pressure decreases (e.g., from 100 bar to 10 bar). As the hydraulic fluid cools, the volume decreases (e.g., from 1.01 L to 1.00 L), thereby completing the cycle.

Thermal Unit

Figure 6C:
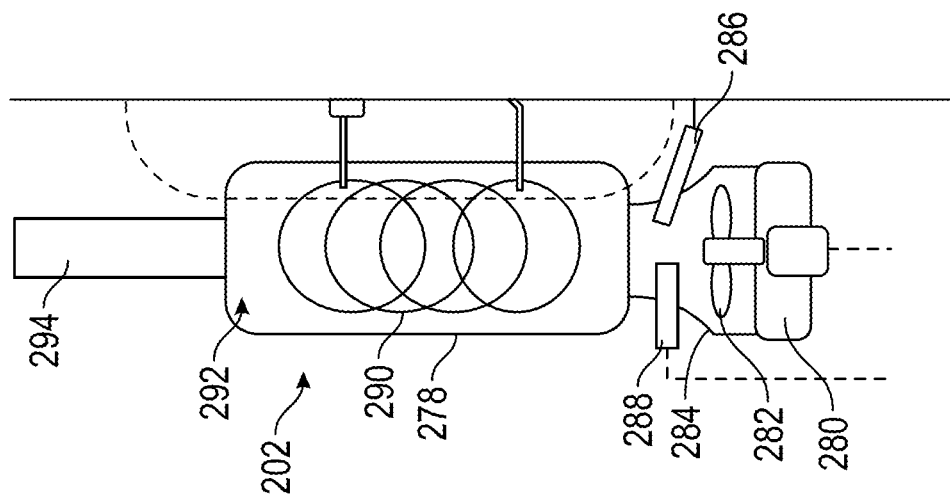
FIG. 6C is schematic diagram of a thermal unit of a hydraulic propulsion system, according to at least one illustrated embodiment.
Figure 6A:
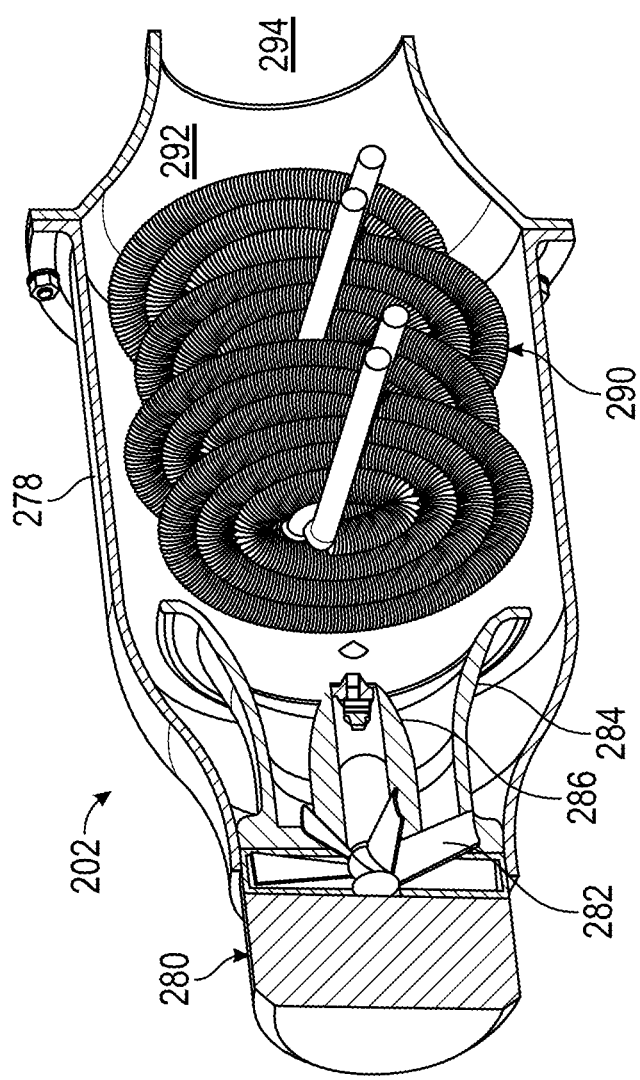
FIG. 6A is an illustration of a thermal unit of a hydraulic propulsion system, according to at least one illustrated embodiment.
Figure 6B:
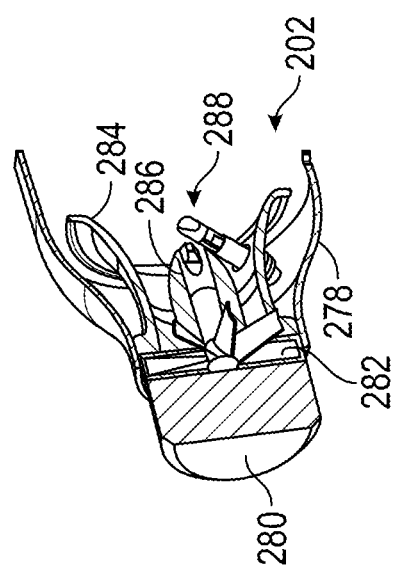
FIG. 6B is another illustration of a thermal unit of a hydraulic propulsion system, according to at least one illustrated embodiment.

FIGS. 6A-6C are illustrations of portions of the hydraulic propulsion system 200 that include a thermal unit. FIGS. 6A and 6B illustrate a three-dimensional model of a thermal unit 202, and FIG. 6C illustrates a schematic diagram of the thermal unit 202. As illustrated in FIG. 6A, the thermal unit 202 includes an air filter 280 and a fan 282 for drawing air into the thermal unit 202 through the air filter 280. The air filter 280 and the fan 282 are positioned within an air intake of the thermal unit 202, as well as within a housing 278 of the thermal unit 202. The air filter 280 and the fan 282 may be referred to collectively as an "air preparation" portion of the thermal unit 202.

As illustrated in FIGS. 6A and 6B together, the thermal unit 202 also includes a nozzle 284, a fuel injector 286, and an igniter 288 for controlling the flow of air through the thermal unit 202 and initiating combustion within the thermal unit 202. These three components are located in a "combustion" portion of the thermal unit 202. As also illustrated in FIG. 6A, the thermal unit 202 further includes an elongate coil 290 wound throughout a "heat exchange" portion of the thermal unit 202. A hydraulic fluid (such as the one of the dilating hydraulic fluids discussed herein) flows into and through the elongate coil 290, so that heat from the combustion of the fuel in the "combustion" portion of the thermal unit 202 is exchanged from the air flowing through the thermal unit 202 to the hydraulic fluid within the elongate coil 290. The air flowing through the thermal unit 202 then flows past the elongate coil 290, through an "exhaust" portion 292 of the thermal unit 202. The air then flows either into the environment or an "after-treatment" portion 294 of the thermal unit 202.

Sonic Transmission Unit

Figure 7A:
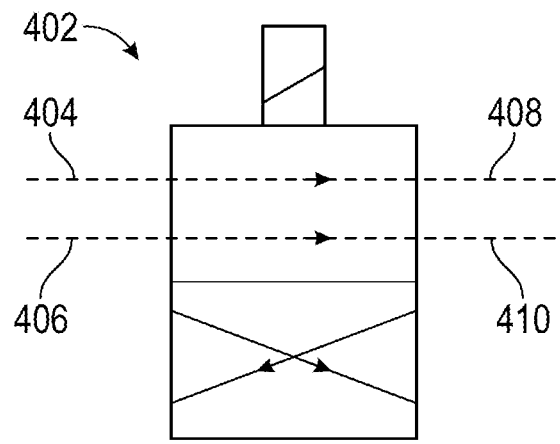
FIG. 7A is a schematic diagram of a flow control valve of a sonic transmission unit in a hydraulic propulsion system, according to at least one illustrated embodiment.
Figure 7B:
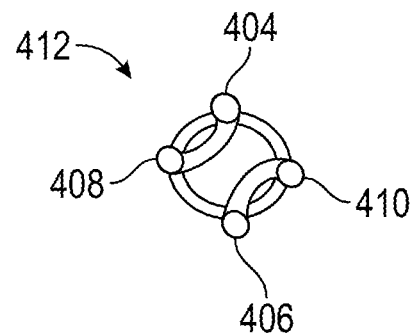
FIG. 7B is a schematic diagram of a flow control valve of a sonic transmission unit in a hydraulic propulsion system, according to at least one illustrated embodiment.
Figure 7C:
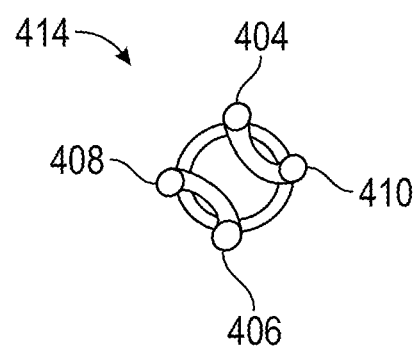
FIG. 7C is a schematic diagram of a flow control valve of a sonic transmission unit in a hydraulic propulsion system, according to at least one illustrated embodiment.

FIGS. 7A-7F illustrate a three-dimensional model and schematic diagrams of a flow control valve 402 of the sonic transmission unit 203. The flow control valves of the sonic transmission unit 203 in the hydraulic propulsion system 200 described herein have the same or similar features as one another, and the same or similar features as that of flow control valve 402 of the sonic transmission unit 203, as illustrated in FIGS. 7A-7F. As illustrated in FIGS. 7A and 7F, the flow control valve 402 of the sonic transmission unit 203 includes a first inlet 404, a second inlet 406, a first outlet 408, and a second outlet 410, and two potential open positions. In the first potential open position 412, illustrated in FIG. 7B, inlet 404 is coupled to outlet 408 and inlet 406 is coupled to outlet 410. In the second potential open position 414, illustrated in FIG. 7C, inlet 404 is coupled to outlet 410 and inlet 406 is coupled to outlet 408.

FIGS. 7D and 7E illustrate a plan view and a perspective view, respectively, of a three-dimensional model of the flow control valve 402 of the sonic transmission unit 203. As illustrated in FIGS. 7D and 7E, the flow control valve 402 of the sonic transmission unit 203 includes an outer frame 416, a rotatable gear 418 mounted within the outer frame 416, and a motor 419 mounted within the outer frame 416. The motor 419 engages with the rotatable gear 418 so that the motor 419 can be actuated to turn the rotatable gear 418. The rotatable gear 418 includes a first slot 420 and a second slot. The first slot 420 extends at least partially into a first side of the gear 418 toward a second side of the gear 418 opposite to the first side. The second slot 422 extends at least partially into the first side of the gear 418 toward the second side of the gear 418.

The rotatable gear 418 is rotatable so that the first slot 420 overlaps with the first inlet 404 and the first outlet 408 to couple the first inlet 404 to the first outlet 408, and so that the second slot 422 overlaps with the second inlet 406 and the second outlet 410 to couple the second inlet 406 to the second outlet 410, to provide the first potential open position 412. Similarly, the rotatable gear 418 is rotatable so that the first slot 420 overlaps with the first inlet 404 and the second outlet 410 to couple the first inlet 404 to the second outlet 410, and so that the second slot 422 overlaps with the second inlet 406 and the first outlet 408 to couple the second inlet 406 to the first outlet 408, to provide the second potential open position 414. In addition to providing one of the first and second potential open positions 412 and 414, the rotatable gear 418 is rotatable so that the first slot 420 only overlaps with one of the inlets 404 and 406 or one of the outlets 408 and 410, and so that the second slot 422 only overlaps with one of the inlets 404 and 406 or one of the outlets 408 and 410, and thus, the valve 402 provides a closed position rather than an open position.

FIGS. 8A and 8B are additional illustrations of portions of the hydraulic propulsion system 200, with some modifications to the implementations illustrated in the preceding figures. In particular, FIGS. 8A and 8B illustrate a three-dimensional model and a schematic diagram, respectively, of a hydraulic cylinder 230 and related components of the sonic transmission unit 203 in the hydraulic propulsion system 200. As illustrated in FIGS. 8A and 8B, the hydraulic cylinder 230 includes a first inlet/outlet 250, and second inlet/outlet 252, a third inlet/outlet 254, and a fourth inlet/outlet 256. Depending on the positions of the first and second flow control valves 220 and 222 of the sonic transmission unit 203, the hydraulic cylinder 230 has either a first inlet 250, a second inlet 252, a first outlet 254, and a second outlet 256, or a first inlet 254, a second inlet 256, a first outlet 250, and a second outlet 252.

As described above with respect to FIG. 5, the hydraulic cylinder 230 of the sonic transmission unit illustrated in FIGS. 8A and 8B houses a fixed dividing wall 240, which divides the hydraulic cylinder 230 into two distinct and rigid hydraulic chambers. Each hydraulic chamber is itself divided into two sub-chambers that are separated by additional dividing walls 241. A first one of the chambers houses a first piston 242 and a first elastic element or spring 244 coupled to the first piston 242 and to the dividing wall 240 in its first sub-chamber, as well as a third piston 243 and a third elastic element or spring 245 coupled to the third piston 243 and to a wall opposite the dividing wall 240 in its second sub-chamber. A second one of the chambers houses a second piston 246 and a second elastic element or spring 248 coupled to the second piston 246 and to the dividing wall 240 in its first sub-chamber, as well as a fourth piston 247 and a fourth elastic element or spring 249 coupled to the fourth piston 247 and to a wall opposite the dividing wall 240. The hydraulic cylinder 230 illustrated in FIGS. 8A and 8B includes a dilating fluid that flows into and out of the hydraulic cylinder 230 through the first inlet/outlet 250 and the second inlet/outlet 252, and a working fluid that flows into and out of the hydraulic cylinder 230 through the third inlet/outlet 254 and the fourth inlet/outlet 256. The working fluid is separated from the dilating fluid within the hydraulic cylinder 230 by the first and second pistons 242 and 246.

When relatively high-pressure waves travelling through the dilating fluid enter the hydraulic cylinder 230 through the first and second inlets 250 and 252, they travel toward and then exert relatively high pressures against the first and second pistons 242 and 246. As a result, the pistons 242 and 246 are urged to move toward the working fluid, compress the first and second springs 244 and 248, and initiate relatively high-pressure waves that travel through the working fluid toward the third and fourth pistons 243 and 247 and the third and fourth springs 245 and 249. The high pressure waves compress the springs 245 and 249 and travel toward the outlets 254 and 256 to exit the hydraulic cylinder 230 through the outlets 254 and 256.

When relatively high-pressure waves travelling through the working fluid enter the hydraulic cylinder 230 through the inlets 254 and 256, they travel toward and then exert relatively high pressures against the third and fourth pistons 243 and 247, third and fourth springs 245 and 249, and first and second pistons 242 and 246. As a result, the springs 245 and 249 are compressed, the springs 244 and 248 are extended, and the pistons 242 and 246 are urged to move toward the dilating fluid to initiate relatively high-pressure waves that travel through the dilating fluid toward the outlets 250 and 252 to exit the hydraulic cylinder 230 through the outlets 250 and 252.

Thus, as the first and second flow control valves 220 and 222 are moved back and forth between their respective first and second positions, and as the relatively high-pressure waves alternate between entering the hydraulic cylinder 230 through the inlets 250 and 252 and through the inlets 254 and 256, the pistons 242 and 246 each begin to oscillate back and forth within the hydraulic cylinder 230 with respect to the fixed dividing wall 240. The springs 244 and 248 are alternately compressed and extended. In some implementations, this movement of the springs 244 and 248 provides sonic inertia and/or introduces a phase shift into the system's dynamic behavior. Further, as the relatively high-pressure waves travel back and forth through the hydraulic cylinder 230, the springs 245 and 249 are increasingly compressed, which in some implementations provides sonic capacity or energy storage (e.g., accumulation) in the compression of the springs 245 and 249. The masses of the pistons 242, 246, 243, and 247, and the spring constants or stiffness of the springs 244, 245, 248, and 249 are selected or designed so that these components oscillate under resonant conditions, or resonate, within the hydraulic cylinder 230 for a given frequency or given frequencies of the relatively high-pressure waves.

Accumulator Unit

Figure 9:
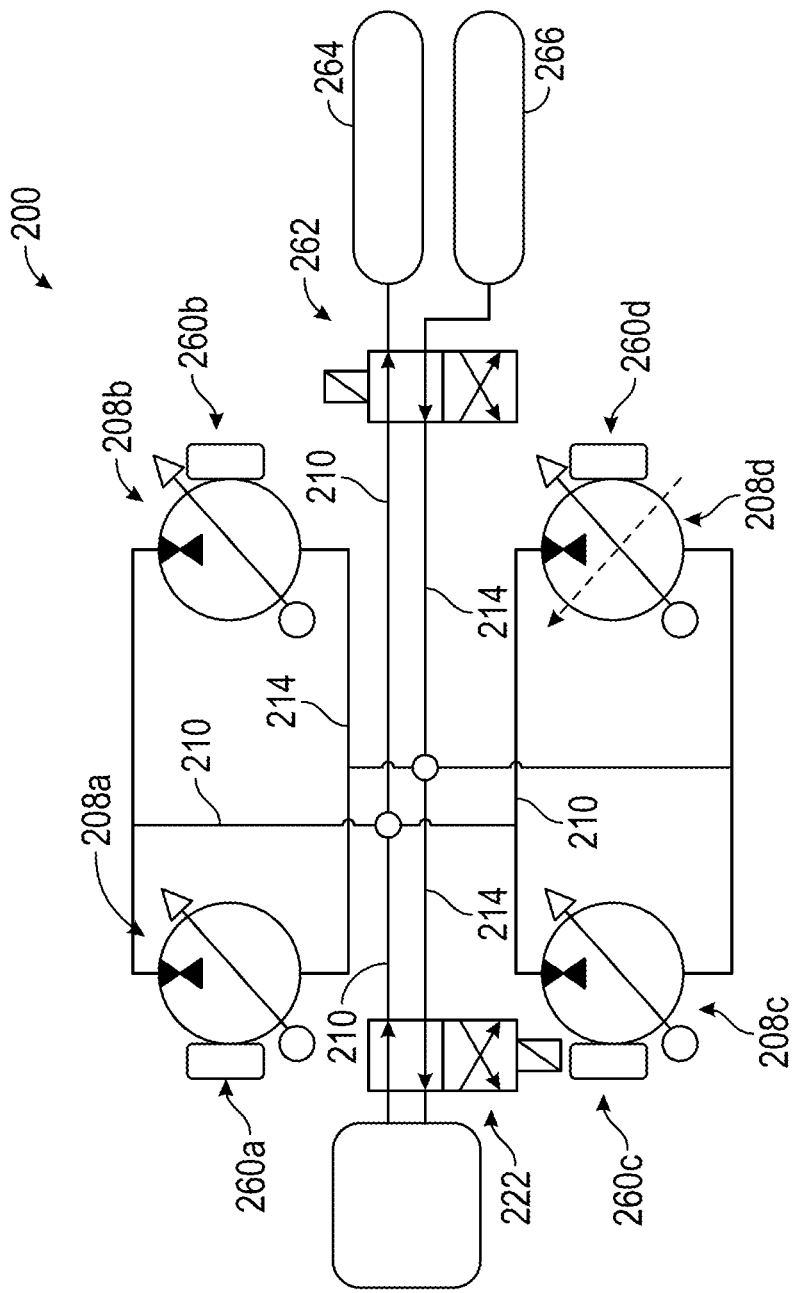
FIG. 9 is another schematic diagram of portions of a hydraulic propulsion system, according to at least one illustrated embodiment.

FIG. 9 is a schematic illustration of portions of the hydraulic propulsion system 200 that include the accumulator unit. As illustrated in FIG. 9, the hydraulic propulsion system 200 includes a set of four hydraulic motors 208a, 208b, 208c, and 208d (collectively, hydraulic motors 208) and four respective gear sets 260a, 260b, 260c, and 260d (collectively, gear sets 260). In some implementations, the hydraulic motors 208 and the gear sets 260 are used to drive the wheels of a wheeled vehicle, such as the four wheels of an automobile or a truck.

Each of the hydraulic motors 208 is hydraulically coupled with one another in parallel rather than in series, which allows the hydraulic motors 208 to be independently coupled to a respective wheel of the wheeled vehicle, and allows for variable, continuous, and independent speed and torque variation at each of the four wheels. The hydraulic motors 208 are coupled to wheels of a wheeled vehicle on axles with open differentials, or in pairs, such as on axles with locking differentials. The hydraulic motors 208 are vane-type hydraulic motors 208.

FIG. 9 also illustrates that the hydraulic propulsion system 200 includes a third flow control valve 262, which is actuated to move between its two positions either independently of, or in unison with, the first and second flow control valves 220 and 222, as well as a high-pressure hydraulic accumulator 264 and a low-pressure hydraulic accumulator 266.

Figure 10A:
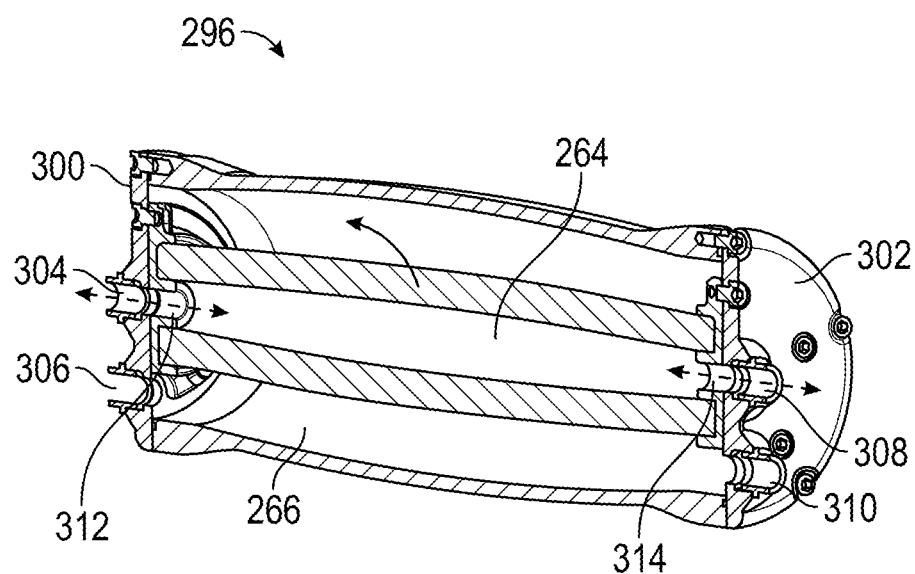
FIG. 10A is a cross-sectional view of an accumulator unit of a hydraulic propulsion system, according to at least one illustrated embodiment.
Figure 10B:
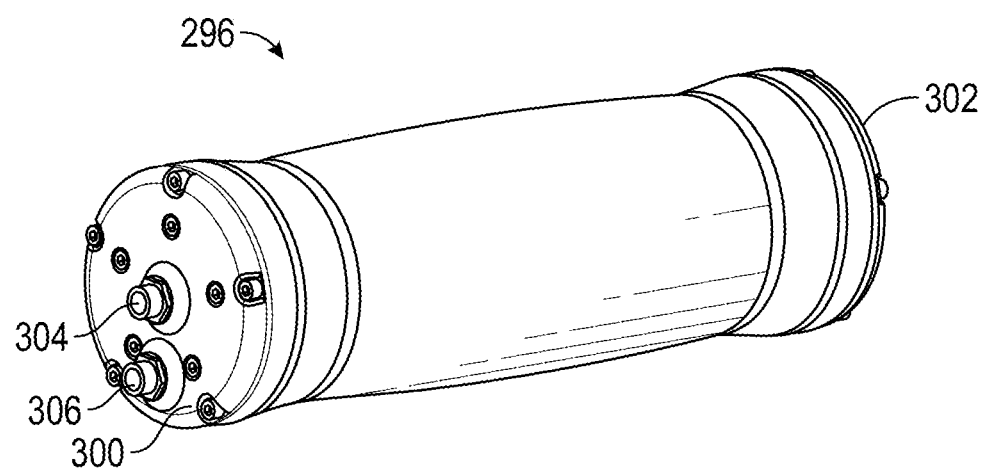
FIG. 10B is a perspective view of an accumulator unit of a hydraulic propulsion system, according to at least one illustrated embodiment.

FIGS. 10A and 10B are additional illustrations of portions of the hydraulic propulsion system 200, with some modifications to the implementations illustrated in the preceding figures. FIGS. 10A and 10B illustrate perspective cross-sectional and perspective views, respectively, of a three-dimensional model of an accumulator unit 296, which acts as a dual high-pressure and low-pressure accumulator unit by incorporating both the high-pressure accumulator 264 and the low-pressure accumulator 266. As illustrated in FIGS. 10A and 10B, the accumulator unit 296 includes a rigid, cylindrical housing 298 coupled at a first end to a first end cap 300 and at a second end opposite the first end to a second end cap 302.

The first end cap 300 includes a first port 304 at a center portion thereof and a second port 306 at a peripheral portion thereof. The second end cap 302 includes a third port 308 at a center portion thereof and a fourth port 310 at a peripheral portion thereof. The first and third ports 304 and 308 couple the high-pressure accumulator 264 to the third flow control valve 262. The second and fourth ports 306 and 310 couple the low-pressure accumulator 266 to the third flow control valve 262.

The accumulator unit 296 also includes a first disc spring 312 positioned against an interior surface of the first end cap 300 surrounding the first port 304, a second disc spring 314 positioned against an interior surface of the second end cap 302 surrounding the third port 308, and an elastomer, cylindrical dividing wall 316, which is welded to the first and second disc springs 312 and 314, and which separates the high pressure accumulator 264 from the low pressure accumulator 266. As high pressure accumulates within the high pressure accumulator 264 and/or low pressure accumulates within the low pressure accumulator 266, the first and second disc springs 312 and 314 extend, and the elastomer dividing wall 316 bows outward, thereby storing energy within the accumulator unit 296. As high pressure is released from the high pressure accumulator 264 and/or low pressure is released from the low pressure accumulator 266, the first and second disc springs 312 and 314 and the elastomer dividing wall 316 relax, thereby releasing the energy stored within the accumulator unit 296.

Figure 10C:
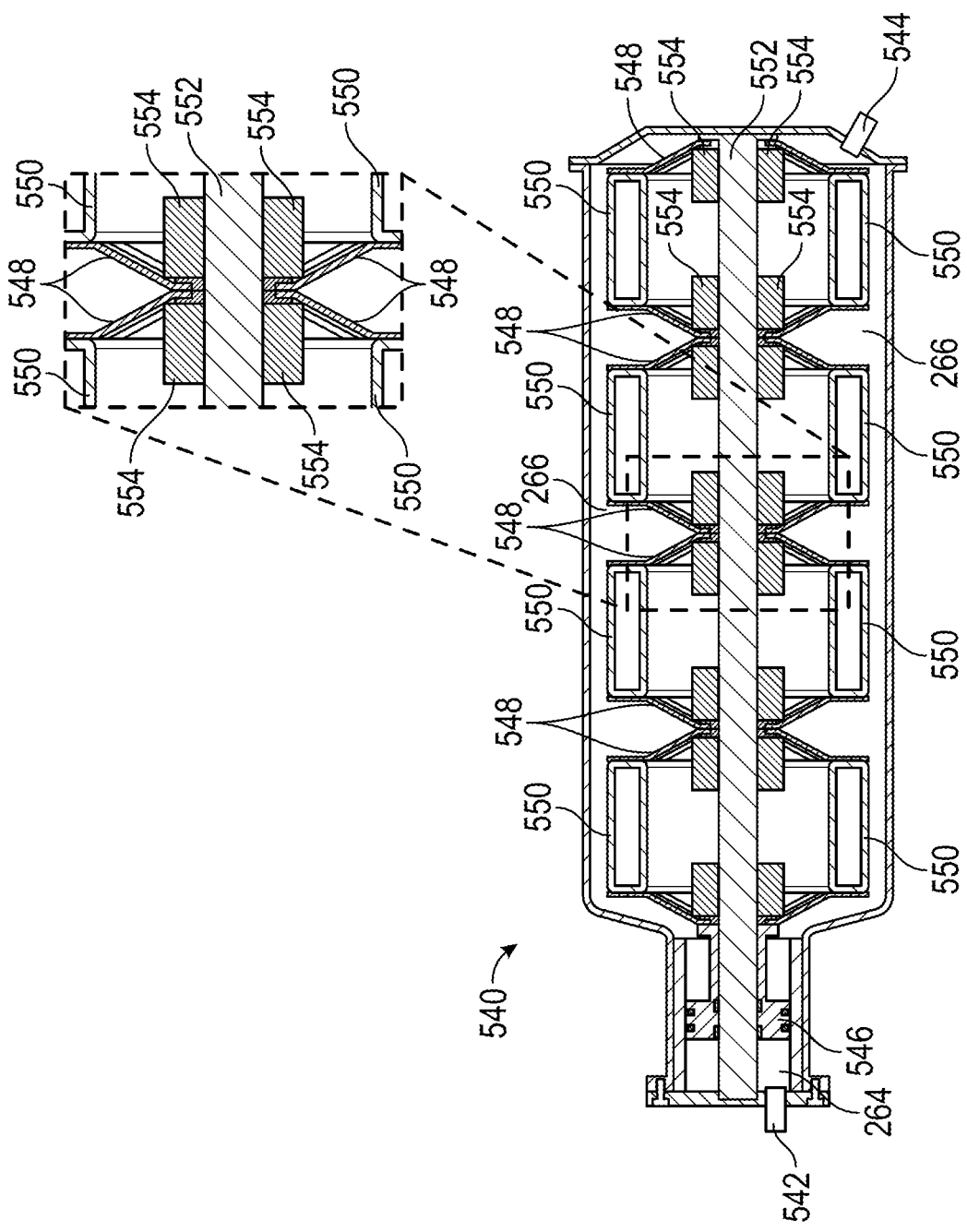
FIG. 10C is a cross-sectional view of an accumulator unit of a hydraulic propulsion system, according to at least one illustrated embodiment.

FIG. 10C is another illustration of portions of the hydraulic propulsion system 200, with some modifications to the implementations illustrated in the preceding figures. In particular, FIG. 10C illustrates a cross-sectional view of an alternative accumulator unit 540, which acts as a dual high-pressure and low-pressure accumulator unit by incorporating both the high-pressure accumulator 264 and the low-pressure accumulator 266. The accumulator unit 540 includes a first inlet port 542 that allows access for a relatively high-pressure fluid to the high pressure accumulator 264, and a second inlet port 544 that allows access for a relatively low-pressure fluid to the low pressure accumulator 266. When a high-pressure fluid is provided to the high-pressure accumulator 264 through the first inlet 542 and/or a low-pressure fluid is provided to the low-pressure accumulator 266 through the second inlet 544, the respective pressures turn a piston 546 within the accumulator 540. This compresses a plurality of disc springs 548 and a plurality of hose-type elastomer springs 550 interconnected with the disc springs 548, thereby storing energy for later use in the compression of the springs 548, 550.

In one implementation, the springs 548 and 550 are mounted on a support shaft 552 running the length of the accumulator 540, to provide support and stability for the springs 548 and 550. In some embodiments, the accumulator 540 includes a plurality of massive bodies 554 coupled to the springs 548 and/or 550. The accumulator 540 is coupled to a hydraulic conduit of the hydraulic propulsion system 200 that carries oscillating pressure waves, as described herein, so that the accumulator 540 can also store energy in the oscillation of the masses 554 and the springs 548, 550. Spring constants or stiffnesses of the springs 548 and 550 and/or the masses of the massive bodies 554 are selected or designed so that these components oscillate under resonant conditions, or resonate, within the accumulator 540.

Figure 10D:
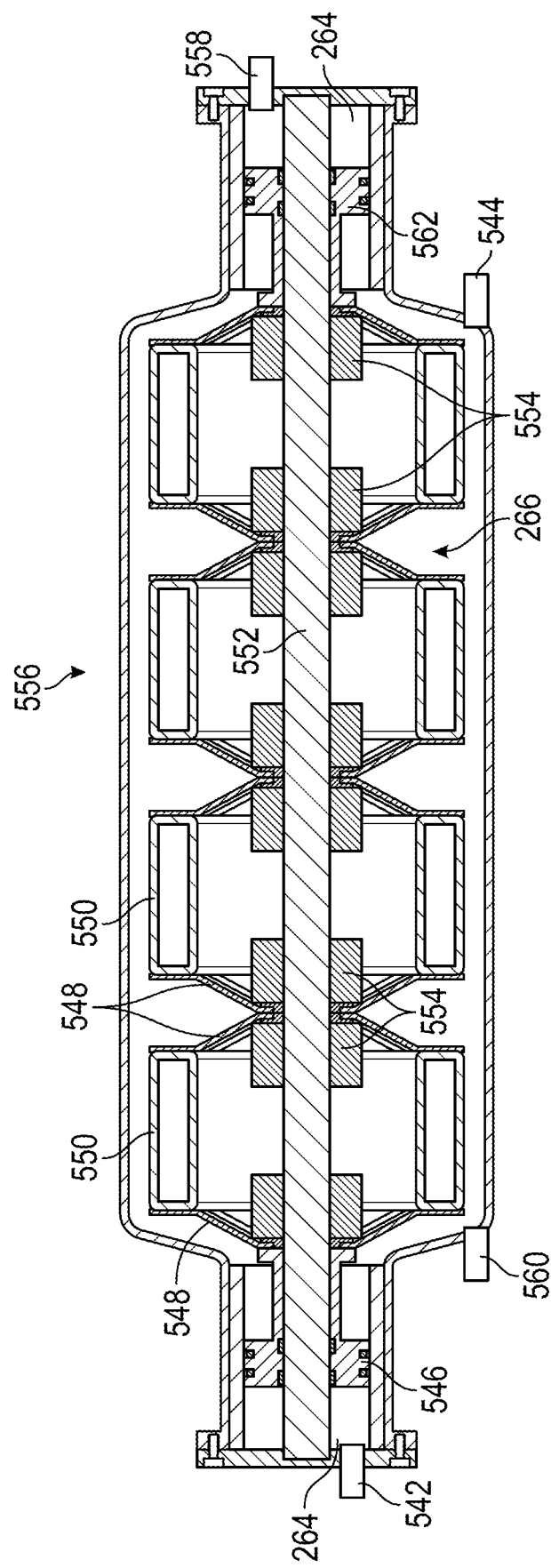
FIG. 10D is a cross-sectional view of an accumulator unit of a hydraulic propulsion system, according to at least one illustrated embodiment.

FIG. 10D is another illustration of portions of the hydraulic propulsion system 200, with some modifications to the implementations illustrated in the preceding figures. FIG. 10D illustrates a cross-sectional view of an alternative implementation of an accumulator unit 556, which acts as a dual high-pressure and low-pressure accumulator unit by incorporating both the high-pressure accumulator 264 and the low-pressure accumulator 266. The accumulator unit 556 has the same features as the accumulator unit 540, except that it includes a third inlet port 558 that allows access for a relatively high-pressure fluid to the high pressure accumulator 264, a fourth inlet port 560 that allows access for a relatively low-pressure fluid to the low pressure accumulator 266, and a second piston 562 coupled to the springs 548 and 550 at an end thereof opposite to the piston 546.

When a high-pressure fluid is provided to the high-pressure accumulator 264 through the first inlet 542 and/or the third inlet 558, and/or a low-pressure fluid is provided to the low-pressure accumulator 266 through the second inlet 544 and/or the fourth inlet 560, the respective pressures move the pistons 546 and/or 562 within the accumulator 540, thereby compressing the springs 548 and/or 550, and storing energy for later use in the compression of the springs 548, 550 and/or in resonance of the springs 548, 550 and pistons 546, 562.

Integrated Hydraulic Power and Control Unit

Figure 11:
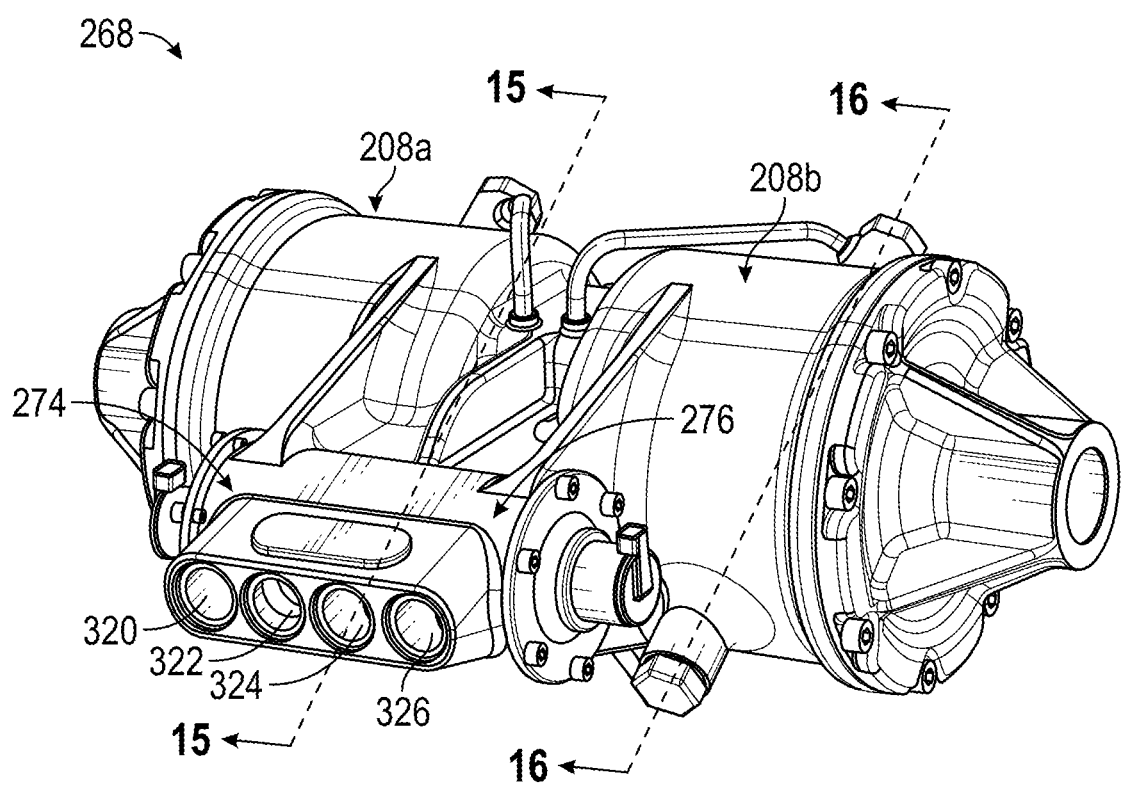
FIG. 11 is an illustration of an integrated hydraulic power and control unit of a hydraulic propulsion system, according to at least one illustrated embodiment.

As shown in some embodiments, FIGS. 11-17 illustrate a three-dimensional model of an integrated hydraulic power and control unit 268 of the hydraulic propulsion system 200. As illustrated in FIG. 11, the integrated hydraulic power and control unit 268 includes a first one of the hydraulic motors 208a (as described above), a second one of the hydraulic motors 208b (as described above), a first dual rotational directional flow control valve 274, and a second dual rotational directional flow control valve 276.

As described in greater detail above, the first and second hydraulic motors 208a and 208b are hydraulically coupled with one another in parallel rather than in series, which allows the hydraulic motors 208a and 208b to be independently coupled to respective wheels of a wheeled vehicle. In this manner, the hydraulic motors 208a and 208b provide the respective wheels with different levels of power or torque as needed based on different power or torque demands, such as when a vehicle is cornering. The hydraulic motors 208a and 208b are vane-type hydraulic motors.

FIG. 12 illustrates an exploded view of an implementation of the integrated hydraulic power and control unit 268. As shown in FIG. 12, the hydraulic motors 208a and 208b are housed within a single integrated housing 318, which includes a first hollow cylindrical housing portion for the first hydraulic motor 208a and a second hollow cylindrical housing portion for the second hydraulic motor 208b. The housing 318 also includes a first high-pressure port 320, which is coupled to the first hydraulic conduit 210, a first low-pressure port 322, which is coupled to the second hydraulic conduit 214, a second high-pressure port 324, which is coupled to the high-pressure accumulator 264, and a second low-pressure port 326, which is coupled to the low-pressure accumulator 266.

The first hydraulic motor 208a includes a first rotatable housing 328 positioned to rotate about its central longitudinal axis within the first hollow cylindrical housing portion of the housing 318, and a second rotatable housing 330 positioned to rotate about its central longitudinal axis within the first rotatable housing 328. Together, the first and second rotatable housings 328 and 330 reduce friction, stress, and hydraulic leaks between the housing 318 and the moving components of the first hydraulic motor 208a housed therein.

The first hydraulic motor 208a also includes a rotor 332 positioned to rotate about its central longitudinal axis within the second rotatable housing 330, the rotor 332 having a plurality of radially-oriented vane grooves 336 within which respective vanes 334 are seated. In one implementation, the rotor 332 has an outer diameter of 100 mm, a length of 100 mm, and an eccentricity of 6 mm within the second rotatable housing 330 when positioned therein. The first hydraulic motor 208a also includes a journal bearing 338, which is rigidly coupled to the rotor 332 and to an output shaft 354 for transferring power or torque from the first hydraulic motor 208a to a wheel 356 of a wheeled vehicle. The first hydraulic motor 208a also includes an end cap 340 that is coupled to the housing 318 by a plurality of screws 342 to seal the other components of the first hydraulic motor 208a within the housing 318.

As illustrated in FIG. 12 with respect to the second hydraulic motor 208b, the housing 318 includes a separation wall 344 that extends longitudinally out of the second hollow cylindrical housing portion and, when the integrated hydraulic power and control unit 268 is assembled, extends longitudinally through the center of the rotor 332. The first and second hydraulic motors 208a and 208b have the same features and components as one another.

As also illustrated in FIG. 12, the first dual rotational directional flow control valve 274 includes a rotor 346 and a stepper motor 348 for controlling the rotor 346, and the second dual rotational directional flow control valve 276 includes a rotor 350 and a stepper motor 352 for controlling the rotor 350.

Figure 13B:
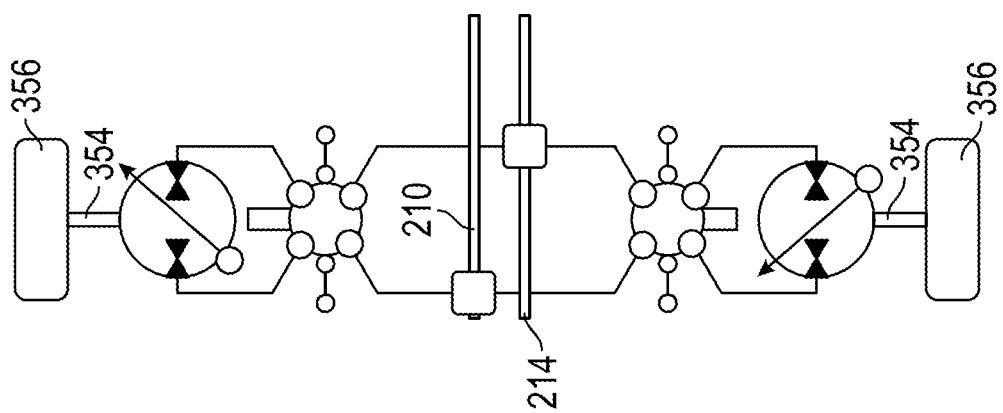
FIG. 13B is a schematic diagram of an integrated hydraulic power and control unit of a hydraulic propulsion system, according to at least one illustrated embodiment.
Figure 13A:
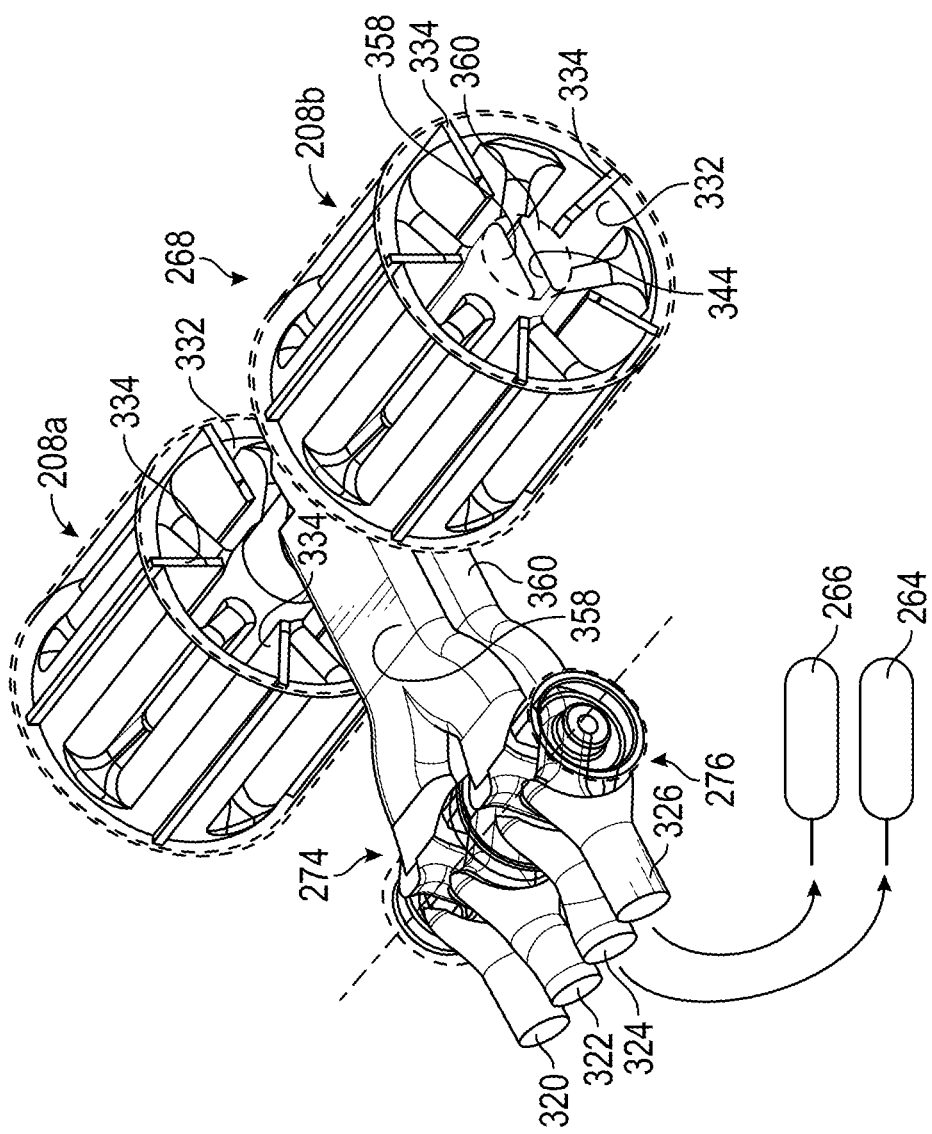
FIG. 13A is an illustration of portions of an integrated hydraulic power and control unit of a hydraulic propulsion system, according to at least one illustrated embodiment.

FIG. 13A illustrates another view of the integrated hydraulic power and control unit 268 with some components removed. FIG. 13B illustrates a schematic drawing of the connections of the integrated hydraulic power and control unit 268 to other components of the hydraulic propulsion system 200, including output shafts 354 for transferring power or torque from the first and second hydraulic motors 208a and 208b to wheels 356 of a wheeled vehicle. In FIG. 13A, the first and second dual rotational directional flow control valves 274 and 276 are used to couple the high- and low-pressure ports 320, 322, 324, and 326 to either an upper inlet/outlet chamber 358 (which extends from the ports 320, 322, 324, and 326 to an open space above the separation wall 344), or a lower inlet/outlet chamber 360 (which extends from the ports 320, 322, 324, and 326 to an open space below the separation wall 344).

Figure 14:
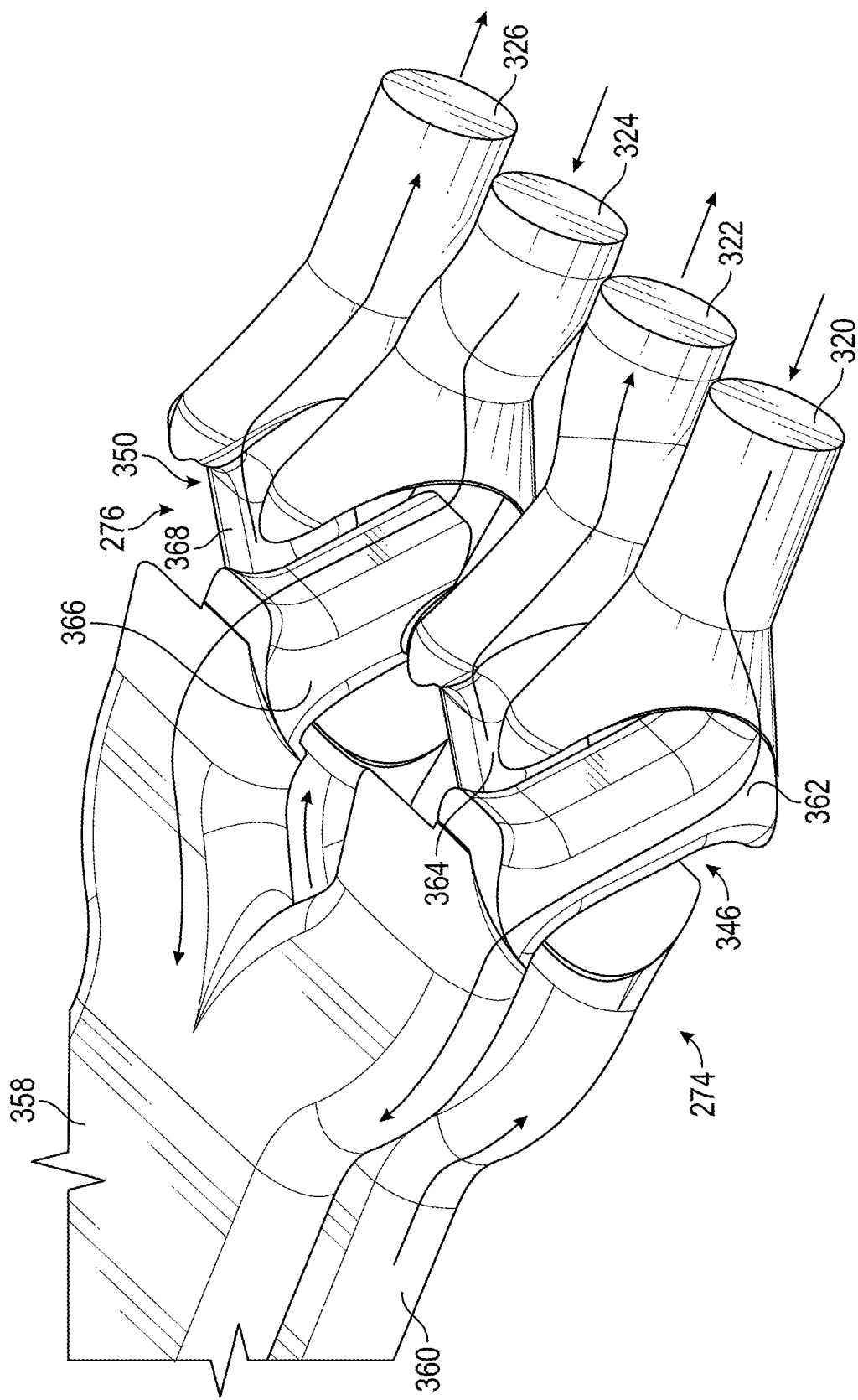
FIG. 14 is an illustration of portions of an integrated hydraulic power and control unit of a hydraulic propulsion system, according to at least one illustrated embodiment.

FIG. 14 illustrates another view of some components of the integrated hydraulic power and control unit 268. In particular, FIG. 14 illustrates that the rotor 346 of the first dual rotational directional flow control valve 274 includes a first conduit 362 and a second conduit 364, and that the rotor 352 of the second dual rotational directional flow control valve 276 includes a third conduit 366 and a fourth conduit 368. The first conduit 362 is used to couple the first high-pressure port 320 to the upper inlet/outlet chamber 358 or to the lower inlet/outlet chamber 360, depending on the orientation of the rotor 346. The second conduit 364 is used to couple the first low-pressure port 322 to the upper inlet/outlet chamber 358 or to the lower inlet/outlet chamber 360, depending on the orientation of the rotor 346. The third conduit 366 is used to couple the second high-pressure port 324 to the upper inlet/outlet chamber 358 or to the lower inlet/outlet chamber 360, depending on the orientation of the rotor 350. The fourth conduit 368 is used to couple the second low-pressure port 326 to the upper inlet/outlet chamber 358 or to the lower inlet/outlet chamber 360, depending on the orientation of the rotor 350.

The conduits 362, 364, 366, and 368 extend radially through the respective rotors 346 and 350 from respective first locations in the cylindrical outer surface of the respective rotors 346 or 350 to respective second locations in the cylindrical outer surface opposite to the respective first location across the diameter of the respective rotor 346 or 350. The conduits 362 and 364 of the rotor 346 are spaced apart from one another longitudinally along the length of the rotor 346, and are oriented such that their central longitudinal axes are oriented approximately 90 degrees apart from one another about a central longitudinal axis of the rotor 346. Similarly, the conduits 366 and 368 of the rotor 350 are spaced apart from one another longitudinally along the length of the rotor 350, and are oriented such that their central longitudinal axes are oriented approximately 90 degrees apart from one another about a central longitudinal axis of the rotor 350.

Thus, the stepper motor 348 can be used to rotate the rotor 346 such that the first conduit 362 is oriented to couple the first high-pressure port 320 to the upper inlet/outlet chamber 358 and the second conduit 364 is oriented to couple the first low-pressure port 322 to the lower inlet/outlet chamber 360. Such an orientation of the rotor 346 is illustrated in FIG. 14. The stepper motor 348 can be used to rotate the rotor 346 by 90 degrees from such an orientation so that the first conduit 362 is oriented to couple the first high-pressure port 320 to the lower inlet/outlet chamber 360 and the second conduit 364 is oriented to couple the first low-pressure port 322 to the upper inlet/outlet chamber 358.

Similarly, the stepper motor 352 can be used to rotate the rotor 350 such that the third conduit 366 is oriented to couple the second high-pressure port 324 to the upper inlet/outlet chamber 358 and the fourth conduit 368 is oriented to couple the second low-pressure port 326 to the lower inlet/outlet chamber 360. Such an orientation of the rotor 350 is illustrated in FIG. 14. The stepper motor 352 can be used to rotate the rotor 350 by 90 degrees from such an orientation, such that the third conduit 366 is oriented to couple the second high-pressure port 324 to the lower inlet/outlet chamber 360 and the fourth conduit 368 is oriented to couple the second low-pressure port 326 to the upper inlet/outlet chamber 358.

Figure 15:
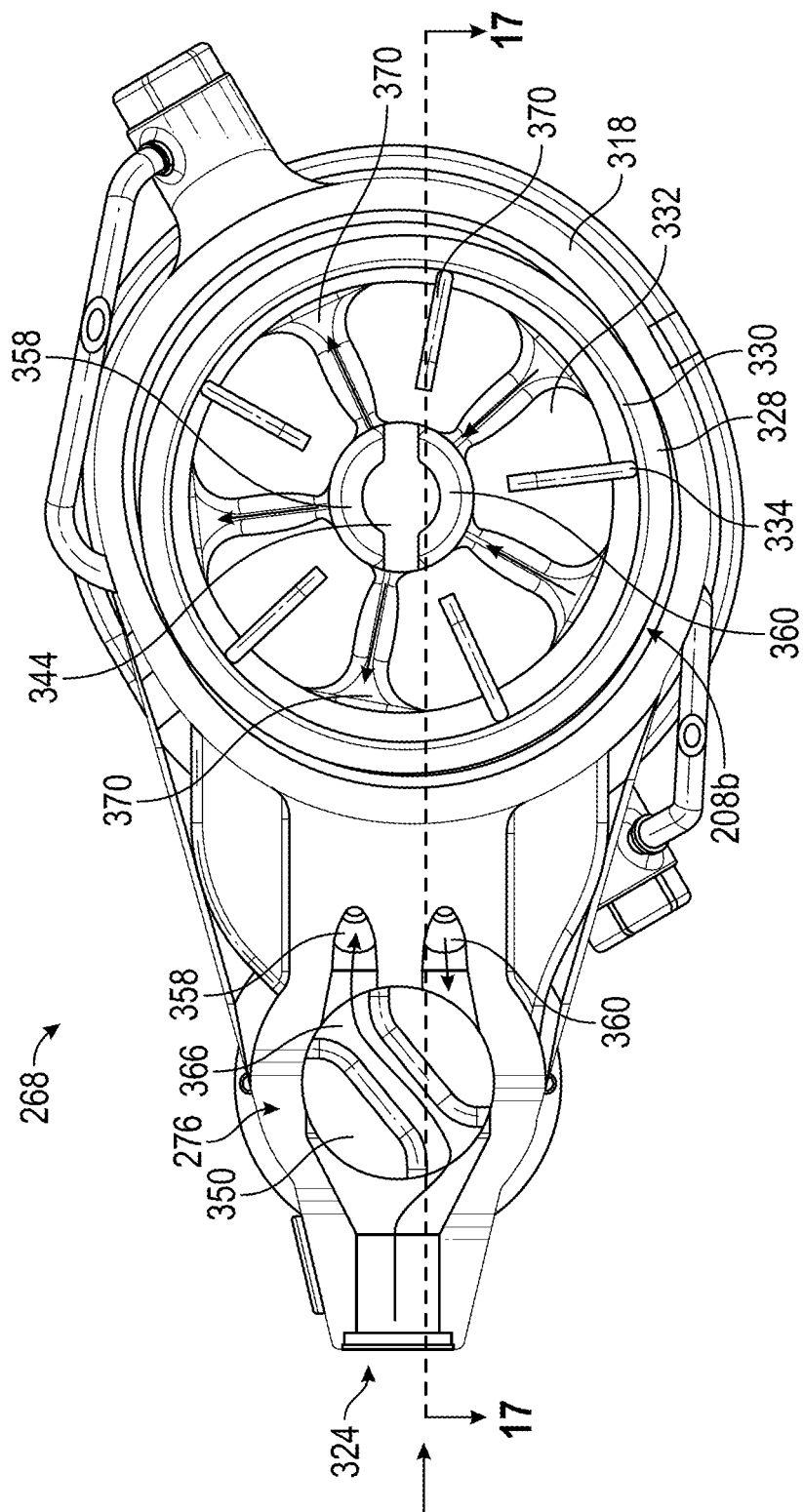
FIG. 15 is a cross-sectional view of an integrated hydraulic power and control unit of a hydraulic propulsion system, according to at least one illustrated embodiment.
Figure 16:
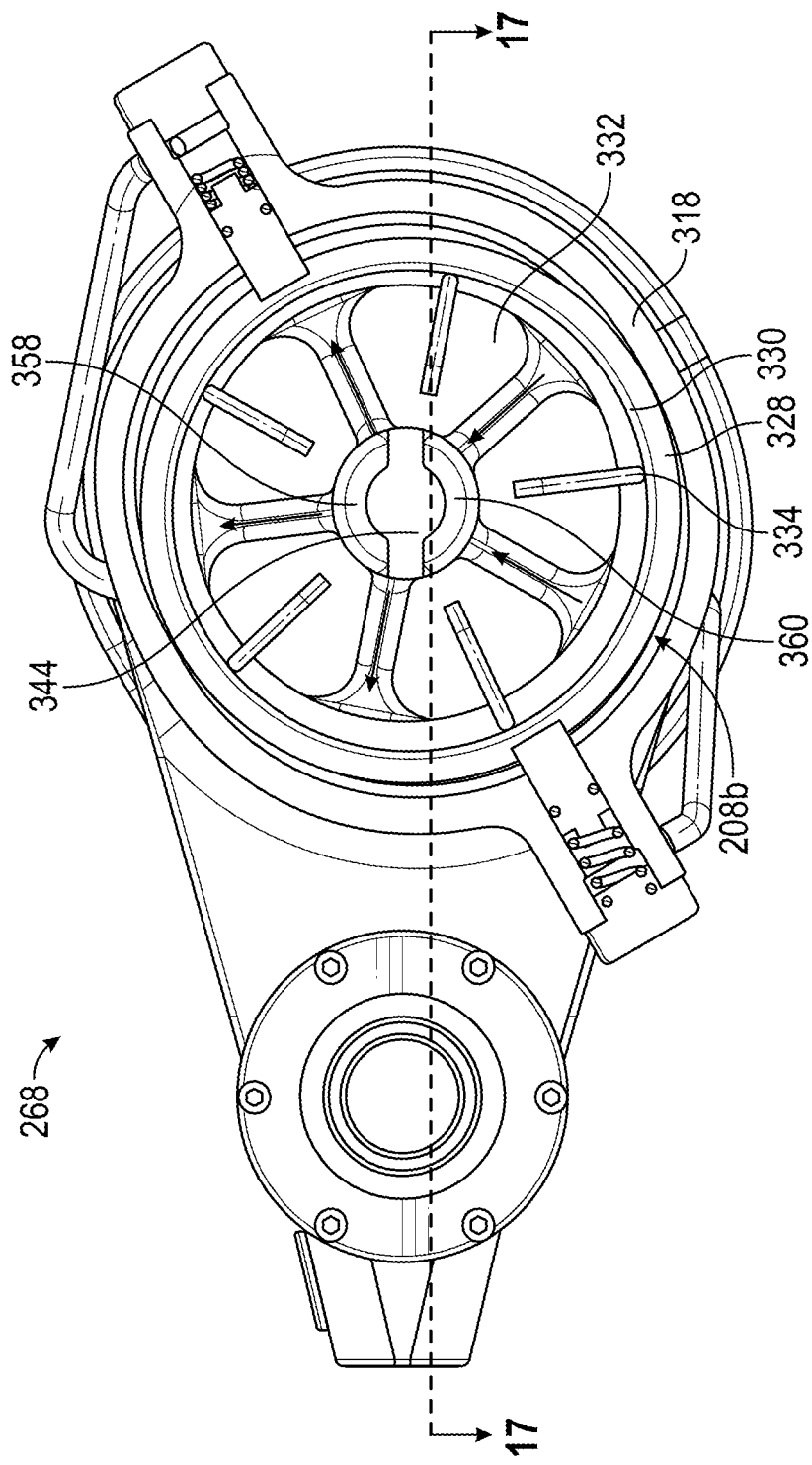
FIG. 16 is a cross-sectional view of an integrated hydraulic power and control unit of a hydraulic propulsion system, according to at least one illustrated embodiment.
Figure 17:
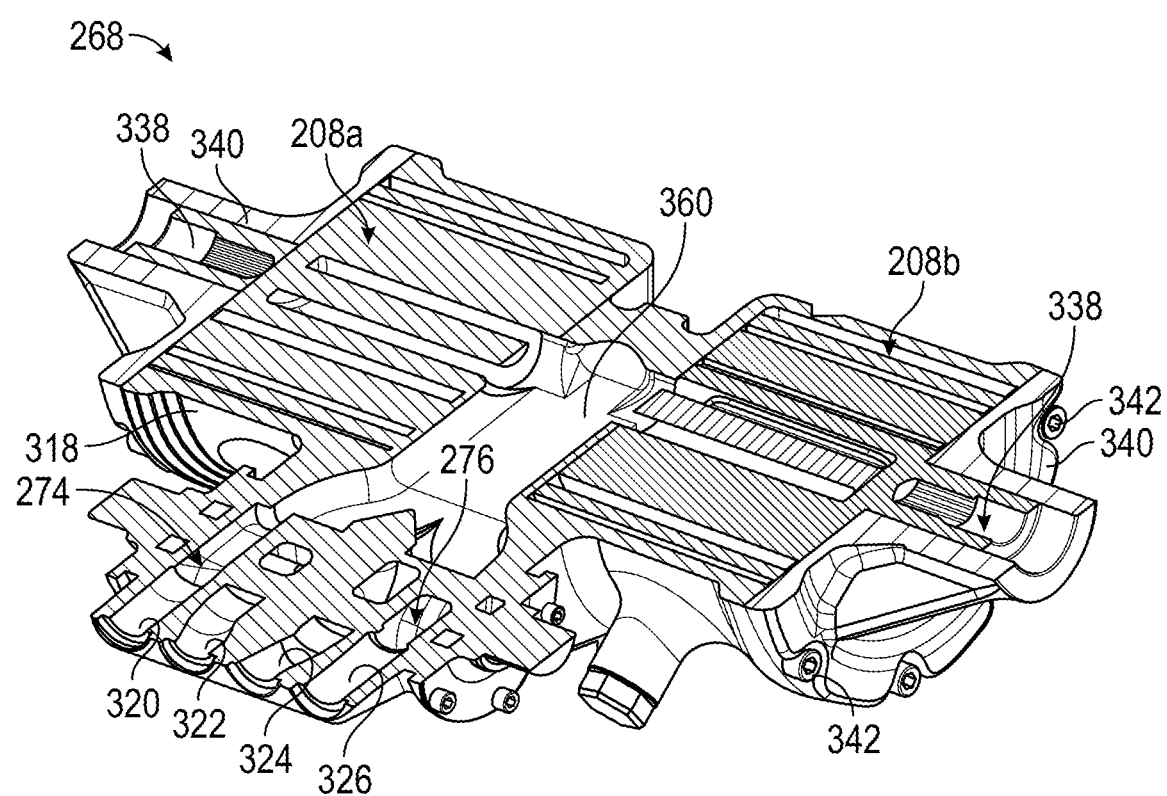
FIG. 17 is a cross-sectional view of an integrated hydraulic power and control unit of a hydraulic propulsion system, according to at least one illustrated embodiment.

FIGS. 15 and 16 illustrate cross-sectional views of the integrated hydraulic power and control unit 268 taken along lines 15-15 and 16-16, respectively, in FIG. 11. FIG. 17 illustrates a cross-sectional view of the integrated hydraulic power and control unit 268 taken along line 17-17 in FIGS. 15 and 16. As illustrated in FIGS. 15-17, relatively high-pressure hydraulic fluid flows into the integrated hydraulic power and control unit 268 through the first or the second high-pressure ports 320 and/or 324, through the conduit 362 and/or the conduit 366, through the upper inlet chamber 358 to the region thereof above the separation wall 344, where it flows radially outward through one or more conduits or channels 370 of the rotor 332, to an open space between an outer surface of the rotor 332 and an inner surface of the second rotatable housing 330.

Once located in this open space, the relatively high-pressure hydraulic fluid interacts with the outer surface of the rotor 332, the inner surface of the second rotatable housing 330, and the vanes 334, in accordance with the principles of standard vane-type hydraulic motors, to induce rotation of the rotor 332 within the second rotatable housing 330 as its pressure decreases. Once the pressure of the hydraulic fluid has decreased and has been used to drive rotation of the rotor 332, the hydraulic fluid flows radially inward through one or more of the conduits 370, through the lower outlet chamber 360, and out of the integrated hydraulic power and control unit 268. The hydraulic fluid then flows through the conduit 364 and/or the conduit 368, and through the first or the second low-pressure ports 322 and/or 326.

In order to drive rotation of the rotor 332 in a direction opposite to that described above, relatively high-pressure hydraulic fluid flows into the integrated hydraulic power and control unit 268 through the first or the second high-pressure ports 320 and/or 324, through the conduit 364 and/or the conduit 368, through the lower inlet chamber 360 to the region thereof below the separation wall 344, where it flows radially outward through one or more conduits or channels 370 of the rotor 332, to the open space between the rotor 332 and the second rotatable housing 330. The relatively high-pressure hydraulic fluid induces rotation of the rotor 332 within the second rotatable housing 330. The hydraulic fluid then flows radially inward through one or more of the conduits 370, through the upper outlet chamber 358, and out of the integrated hydraulic power and control unit 268 through the conduit 362 and/or the conduit 366, and through the first or the second low-pressure ports 322 and/or 326.

While the foregoing description has focused on the second hydraulic motor 208b, the first hydraulic motor 208a has the same or a similar, or a mirror-image configuration, and functions in the same ways as described for the second hydraulic motor 208b. Because the first hydraulic motor 208a and the second hydraulic motor 208b are coupled to one another in parallel and are fed by the same high-pressure hydraulic fluids, the respective rotors and shafts and/or wheels coupled thereto rotate independently of one another, such as at different speeds, providing a differential effect for the integrated hydraulic power and control unit 268.

Figure 18:
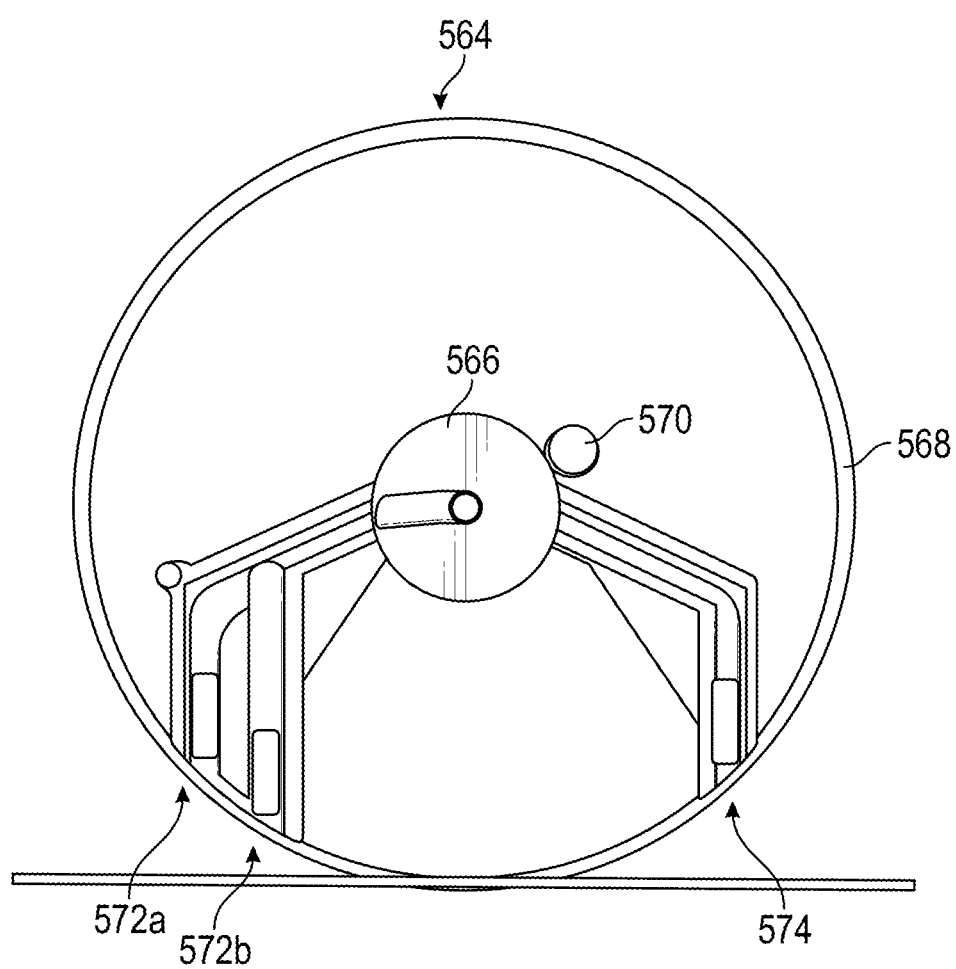
FIG. 18 is a side view of a hydraulic propulsion system, according to at least one illustrated embodiment.
Figure 19:
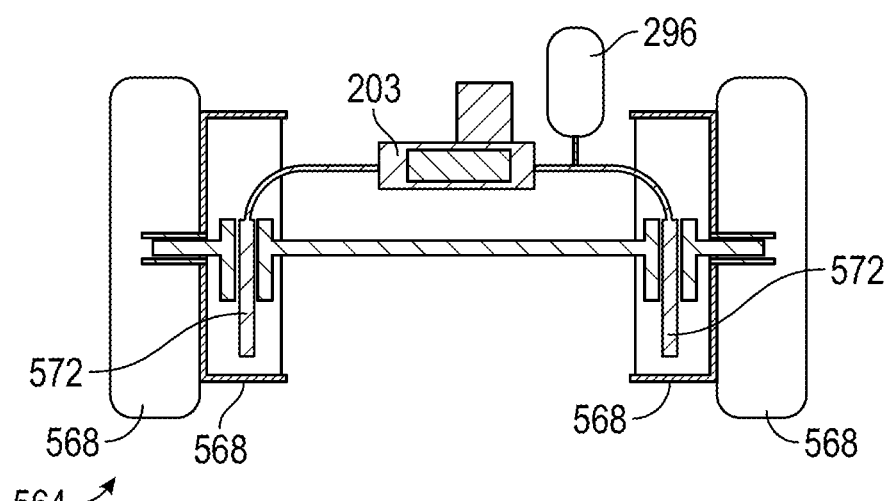
FIG. 19 is an end view of a hydraulic propulsion system, according to at least one illustrated embodiment.

FIGS. 18 and 19 are illustrations of portions of the integrated hydraulic power and control unit of the hydraulic propulsion system 200. In particular, FIGS. 18 and 19 illustrate an alternative hydraulic motor assembly 564, in side and end views, respectively. As illustrated in FIG. 18, the hydraulic motor assembly 564 includes a valve 566 mounted to the hub or bearing of a wheel 568 of a vehicle, as well as a stepper motor 570 that can be actuated to open or close the valve 566 to allow a pressurized hydraulic fluid to pass therethrough. The stepper motor 570 can actuate the valve 566 to open and provide a high-pressure hydraulic fluid to a pair of pistons 572a and 572b. In some embodiments, the pair of pistons 572a and 572b comprise solid pistons. In other embodiments, the pair of pistons 572a and 572b comprise a highly viscous fluid. In one embodiment, the pair of pistons 572a and 572b are mounted near the front of the wheel 568, which is urged by the high-pressure hydraulic fluid to press against the wheel 568 and move the wheel 568 in a forward direction.

The stepper motor 570 can also actuate the valve 566 to open and provide a high-pressure hydraulic fluid to a piston 574. In some embodiments, the piston 574 comprises a solid piston. In other embodiments, the piston 574 comprises a highly viscous fluid. In one embodiment, the piston 574 is mounted near the rear end of the wheel 568, which is urged by the high-pressure hydraulic fluid to press against the wheel 568 and move the wheel 568 in a reverse direction. FIG. 19 illustrates that the hydraulic motor assembly 564 is coupled to, and/or powered by, the sonic transmission unit 203 and/or the accumulator unit 296.

Auxiliary Power Unit

Figure 20A:
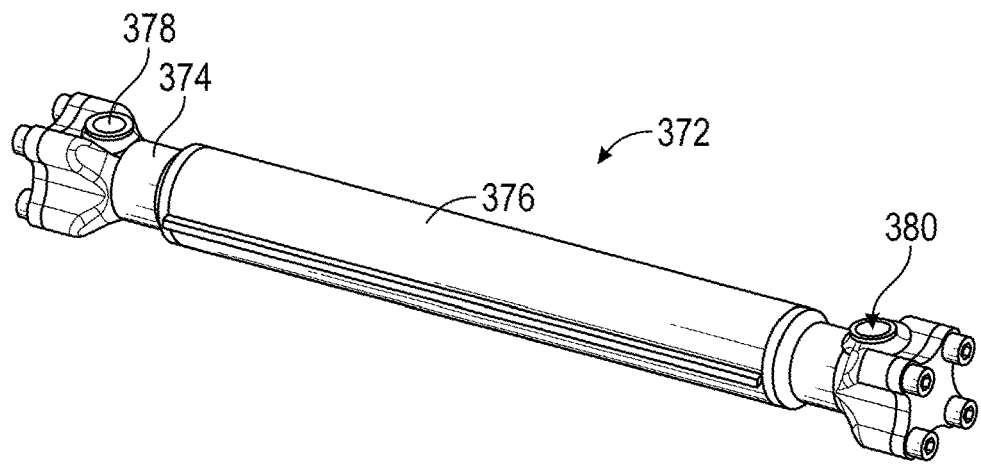
FIG. 20A is a perspective view of an electrical generator unit of a hydraulic propulsion system, according to at least one illustrated embodiment.
Figure 20B:
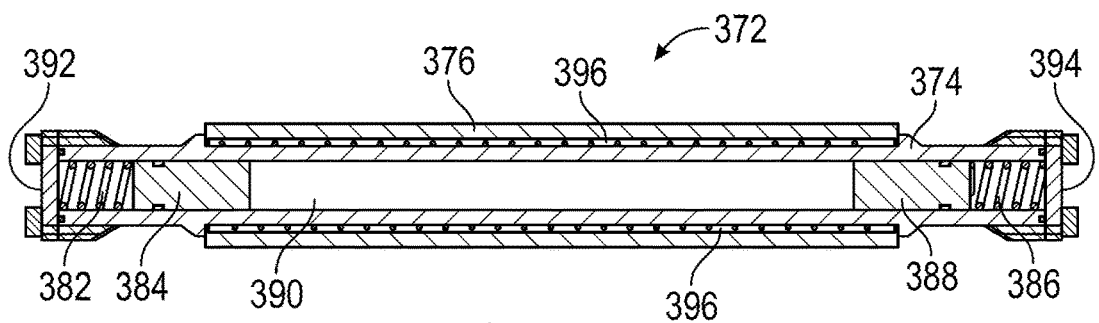
FIG. 20B is a cross-sectional view of an electrical generator unit of a hydraulic propulsion system, according to at least one illustrated embodiment.
Figure 20C:
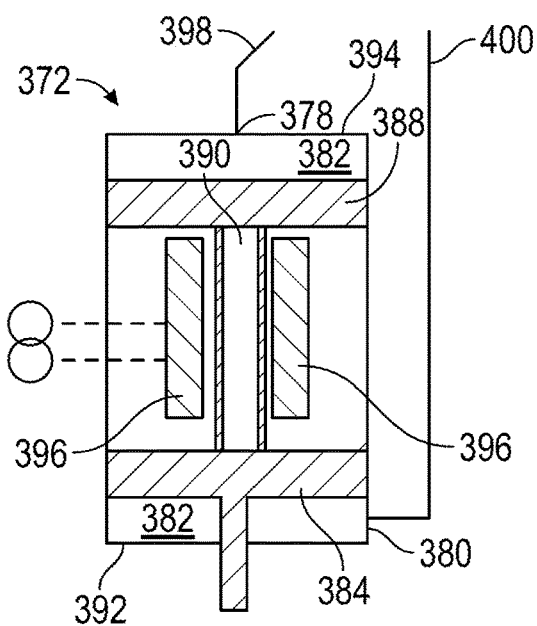
FIG. 20C is a schematic illustration of an electrical generator unit of a hydraulic propulsion system, according to at least one illustrated embodiment.

FIGS. 20A-20C illustrate a three-dimensional model of an electrical generator unit 372 of the hydraulic propulsion system 200, a cross-sectional view thereof, and a schematic illustration thereof, respectively. In particular, FIG. 20A illustrates an embodiment in which the electrical generator unit 372 includes a main body 374, an outer shell 376, a first inlet/outlet port 378, and a second inlet/outlet port 380. FIG. 20B illustrates an embodiment in which the main body 374 contains the electrical generator unit 372. The electrical generator unit 372 includes a first spring 382, a first piston 384, a second spring 386, a second piston 388, and a connecting rod 390. The first spring 382 is engaged with a first end cap 392 and with the first piston 384, the second spring 386 is engaged with a second end cap 394 and with the second piston 388, and the connecting rod 390 is engaged with the first piston 384 and the second piston 388.

FIG. 20B illustrates an embodiment in which the electrical generator unit 372 also includes a coiled wire 396 that surrounds the main body 374 and is positioned within the outer shell 376. FIG. 20C illustrates an embodiment in which the first inlet 378 is coupled by first and second conduits 398 and 400 to a fourth flow control valve, and by the fourth flow control valve to the first and second hydraulic conduits 210 and 214. The fourth flow control valve is used to alternately supply a relatively high-pressure hydraulic fluid to the first conduit 398 and a relatively low-pressure hydraulic fluid to the second conduit 400, and a relatively low-pressure hydraulic fluid to the first conduit 398 and a relatively high-pressure hydraulic fluid to the second conduit 400. The rate at which the fourth flow control valve alternates between such positions is selected, based on the masses of the first piston 384, second piston 388, and connecting rod 390, and based on the spring constants or stiffness of the first and second springs 382 and 386, to induce resonant vibration of the first piston 384, second piston 388, and connecting rod 390 within the main body 374 of the electrical generator unit 372.

In some embodiments, the connecting rod 390 is made of a magnetic material so that its resonance within the main body 374 of the electrical generator unit 372 induces an electrical current within the coiled wire 396. This electrical current is used to power auxiliary systems of a wheeled vehicle or other systems primarily driven by the operation of the integrated hydraulic power and control unit 268. In some implementations, such auxiliary systems include an electrical alternator, a fan, a fuel pump, a power steering pump, and/or an air conditioning compressor.

Application to Wheeled Vehicles

The thermal hydraulic systems described herein are particularly suitable for use in wheeled vehicles such as automobiles, due to the absence of an internal combustion engine, a hydraulic pump, and other relatively heavy, complex components, which weigh down a vehicle and add to efficiency losses. Omitting such components reduces the overall weight of the vehicle and thereby improves fuel efficiency, reduces the number of parts, streamlines maintenance, and lowers emissions. In other implementations, the thermal hydraulic systems described herein can be used to power other mechanical systems, such as the propellers of an aircraft or a boat.

Figure 21A:
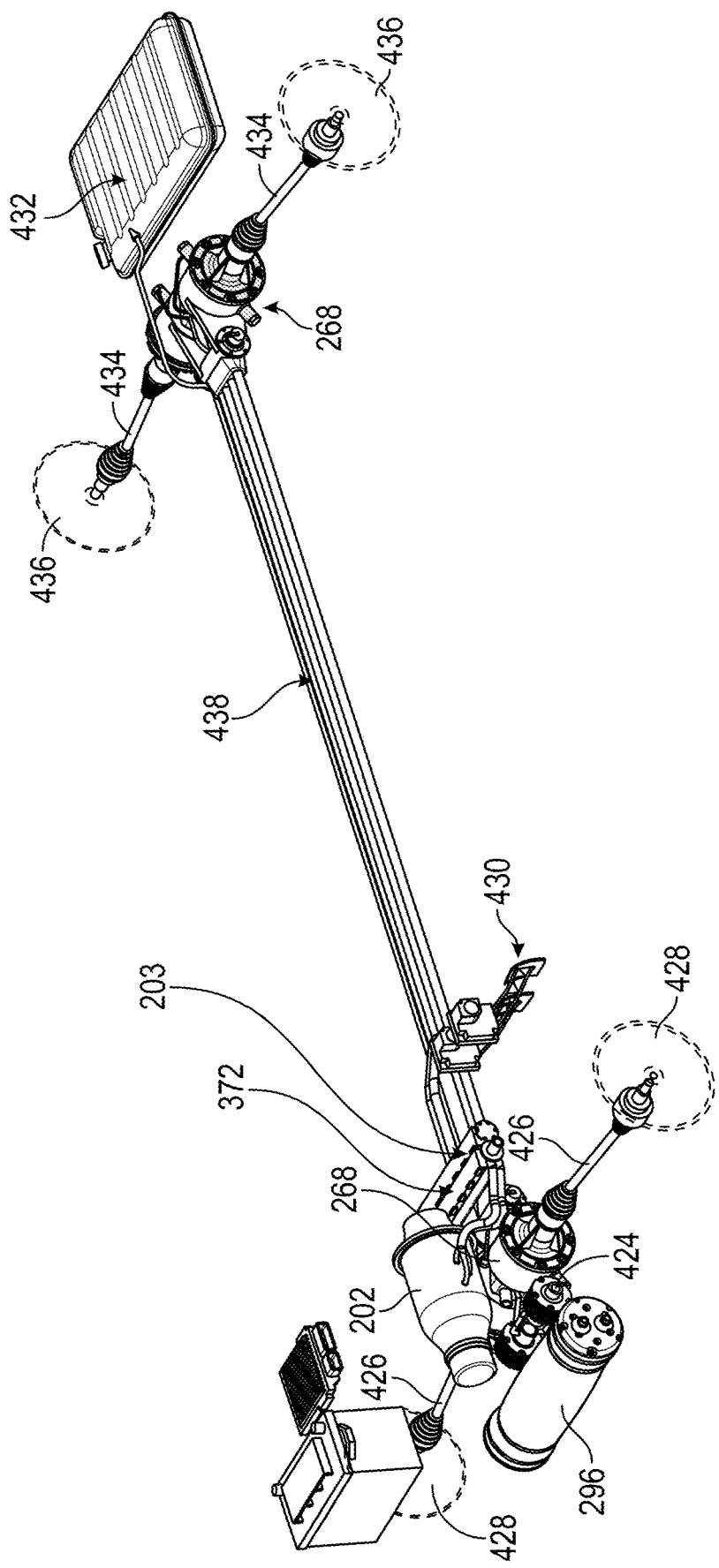
FIG. 21A is a perspective view of various components of a hydraulic propulsion system, arranged for incorporation into a wheeled vehicle, according to at least one illustrated embodiment.
Figure 21B:
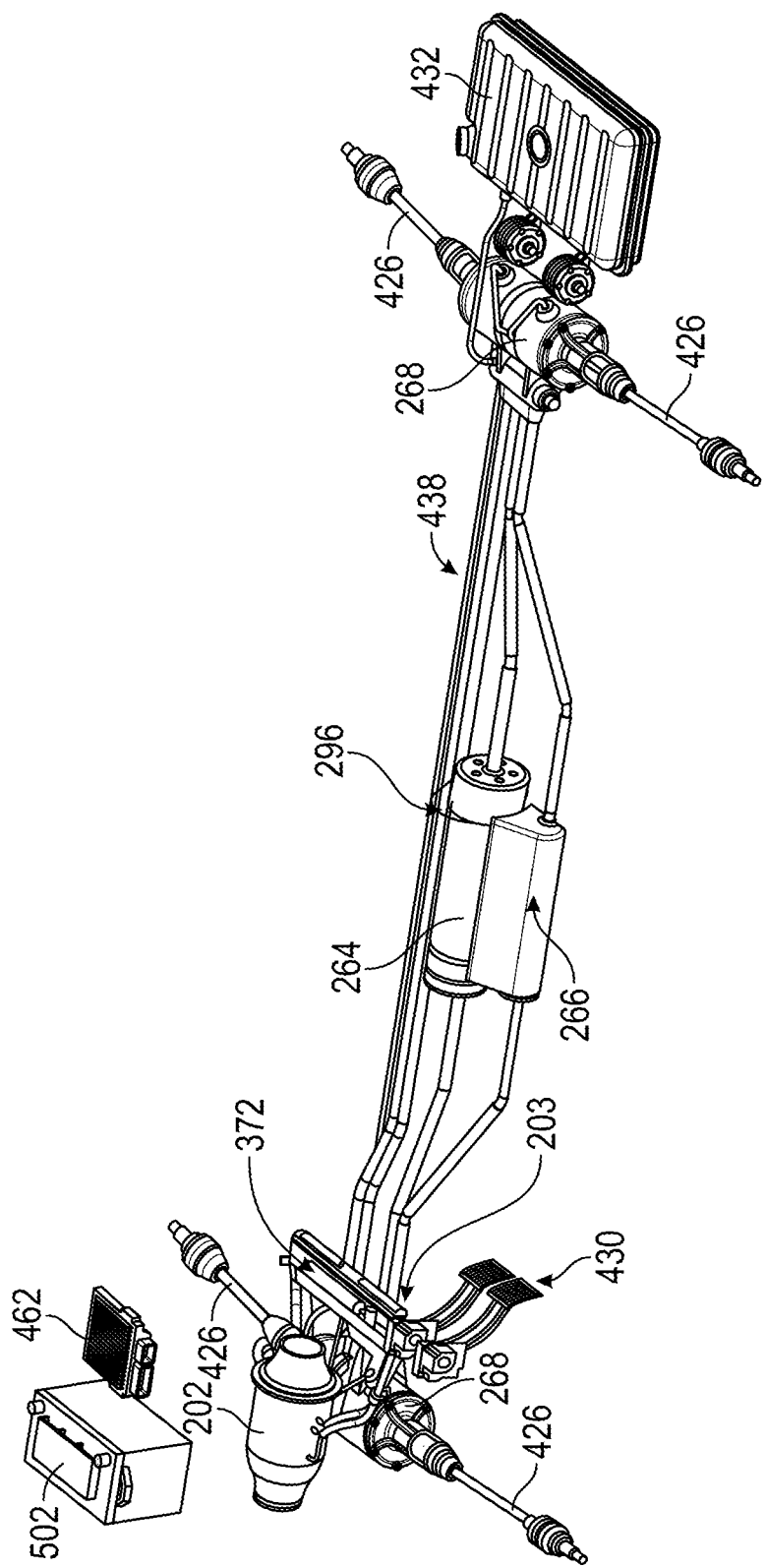
FIG. 21B is a perspective view of various components of a hydraulic propulsion system, arranged for incorporation into a wheeled vehicle, according to at least one illustrated embodiment.

FIGS. 21A and 21B illustrate three dimensional models of the hydraulic propulsion system 200, with a combination of the features of hydraulic propulsion system 200 described herein arranged for incorporation into a wheeled vehicle. As illustrated in FIG. 21A, the hydraulic propulsion system 200 is arranged with the accumulator unit 296 at the front of the wheeled vehicle, with an auxiliary systems actuator 424 positioned behind the accumulator unit 296, and with at least one front axle integrated hydraulic power and control unit 268 positioned behind the auxiliary systems actuator 424 to drive one or more pairs of front axles 426 and one or more pairs of front wheels 428. This embodiment of the hydraulic propulsion system 200 further includes a thermal unit 202 positioned above the front axle integrated hydraulic power and control unit 268, an electrical generator unit 372 positioned behind the front axle integrated hydraulic power and control unit 268, and a sonic transmission unit 203 positioned behind the electrical generator unit 372.

FIG. 21A also illustrates that the hydraulic propulsion system 200 is arranged with one or more control pedals 430 positioned near the front of the vehicle to allow an operator of the vehicle to control the operation of the hydraulic propulsion system 200 and to thereby control the motion of the vehicle. FIG. 21A illustrates that the hydraulic propulsion system 200 is arranged with a fuel tank 432 at the rear end of the vehicle, and with a rear axle integrated hydraulic power and control unit 268 positioned in front of the fuel tank 432 to drive one or more pairs of rear axles 434 and one or more pairs of rear wheels 436. In some implementations, the hydraulic propulsion system 200 includes a plurality of front axle integrated hydraulic power and control units 268 to drive a corresponding plurality of pairs of front axles 426 and front wheels 428, as well as a plurality of rear axle integrated hydraulic power and control units 268 to drive a corresponding plurality of pairs of rear axles 434 and rear wheels 436. Such implementations can be used in large, multi-axle vehicles such as trucks, tractors, construction equipment, farm equipment, and the like.

The hydraulic propulsion system 200 also includes a plurality of hydraulic conduits 438 that extend from the front of the vehicle to the rear of the vehicle, which supply fuel from the fuel tank 432 to the thermal unit 202 and which supply high-pressure hydraulic fluid from the sonic transmission unit 203 and/or from the accumulator unit 296 at the front of the vehicle to the rear axle integrated hydraulic power and control unit 268 at the rear of the vehicle. The hydraulic conduits 438 also return low-pressure hydraulic fluid from the rear axle integrated hydraulic power and control unit 268 at the rear of the vehicle to the sonic transmission unit 203 and/or to the accumulator unit 296 at the front of the vehicle. In some embodiments, the hydraulic propulsion system 200 also includes a battery to power any of the various components thereof. FIG. 21B illustrates an implementation similar to, although different than, the implementation illustrated in FIG. 21A. For example, FIG. 21B illustrates the thermal unit 202, the integrated hydraulic power and control unit 268, the electrical generator unit 372, the accumulator unit 296, and the sonic transmission unit 203.

Figure 22A:
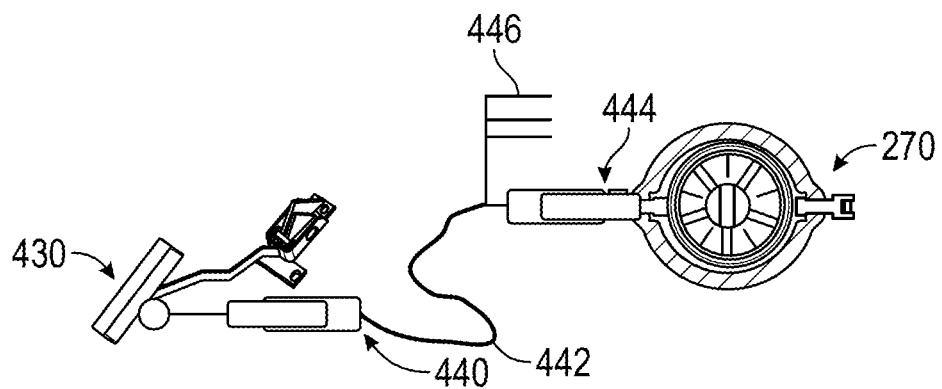
FIG. 22A is a schematic diagram of a control system for a wheeled vehicle including a hydraulic propulsion system, according to at least one illustrated embodiment.
Figure 22B:
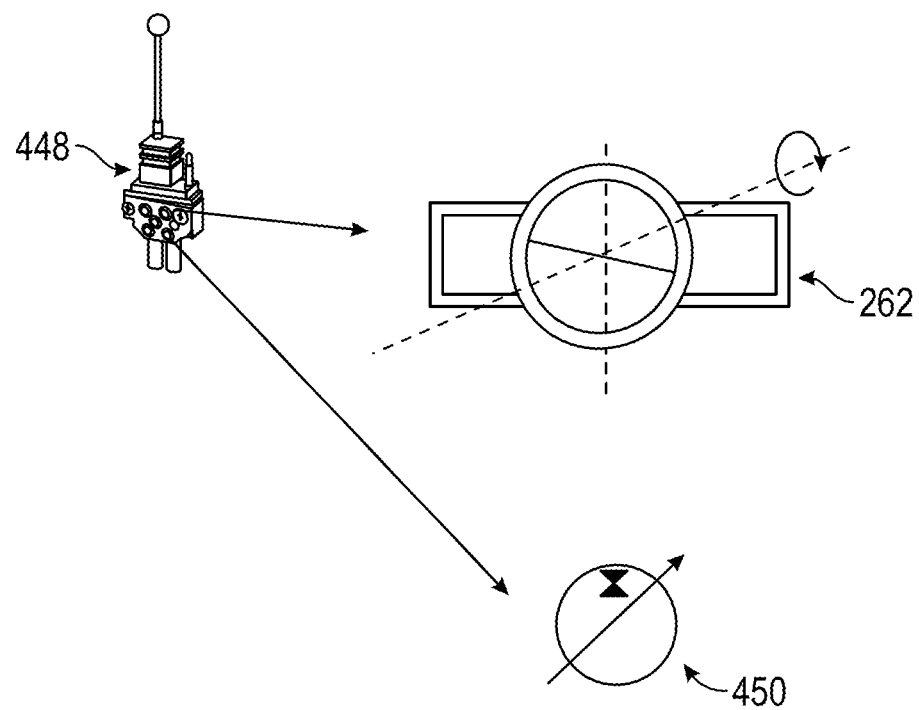
FIG. 22B is a schematic diagram of a control system for a wheeled vehicle including a hydraulic propulsion system, according to at least one illustrated embodiment.

FIGS. 22A and 22B illustrate control systems through which an operator of a motor vehicle or other system powered by the hydraulic propulsion system 200 interacts with the hydraulic propulsion system 200. FIG. 22A illustrates that one such control system includes a pedal 430 mechanically coupled to the piston of a first hydraulic cylinder 440, which is hydraulically coupled by a first hydraulic conduit 442 to a second hydraulic cylinder 444. The piston of the first hydraulic cylinder 440 is mechanically coupled to a hydraulic motor 208 to control its operation. The first hydraulic conduit 442 is coupled to a plurality of additional hydraulic conduits 446, which are coupled to three additional hydraulic motors 208 such that the pedal 430 can be used to control operation of four wheels of a wheeled vehicle.

FIG. 22B illustrates that another such control system includes a manual lever 448 coupled to the third flow control valve 262 and to a fuel pump 450 that is used to pump fuel to the thermal unit 202. Actuation of the manual lever 448 increases the power provided by the hydraulic propulsion system 200 by providing the hydraulic energy stored in the accumulator unit 296 through the third flow control valve 262 and by providing additional heat energy within the thermal unit 202.

Figure 23:
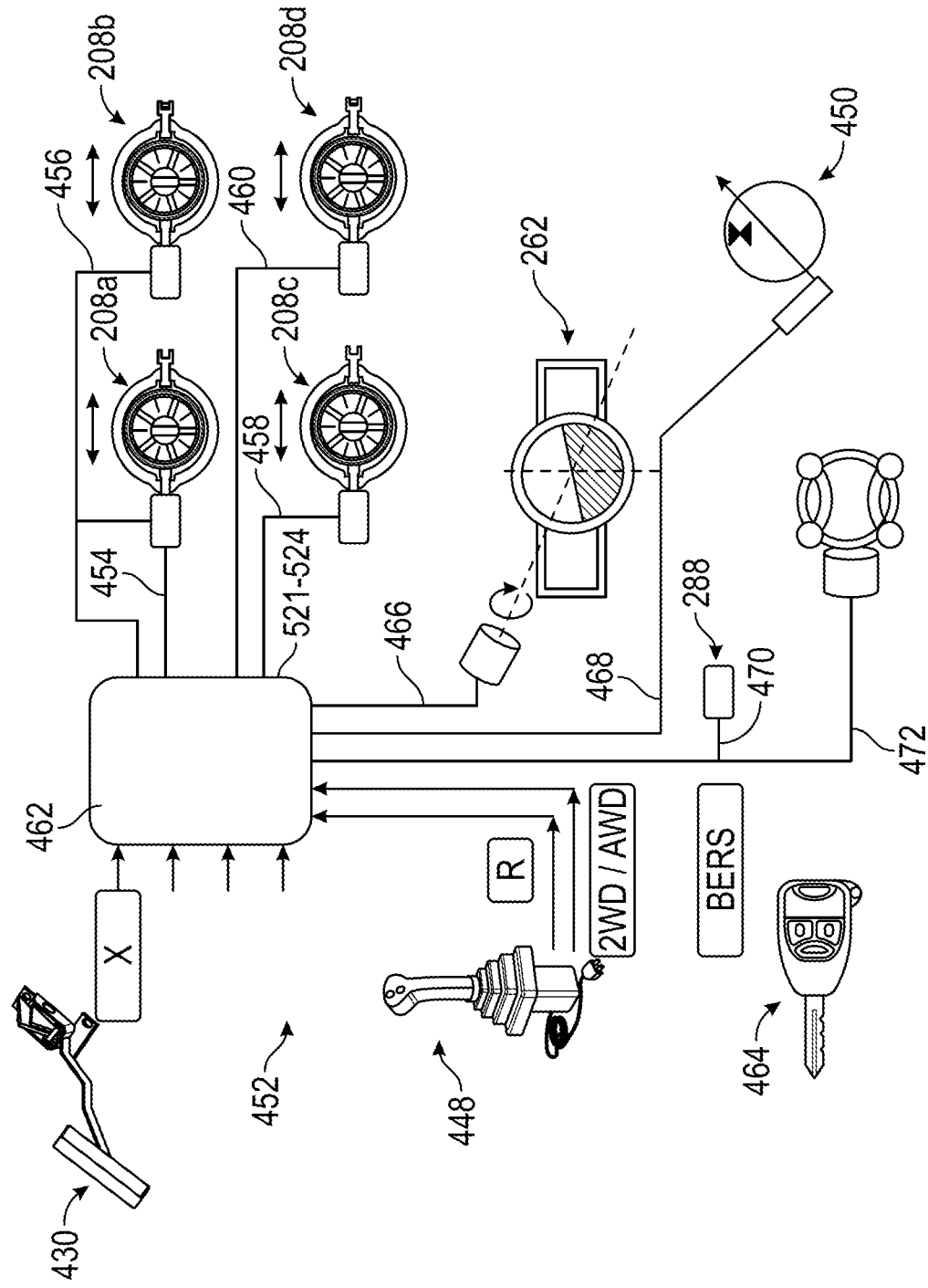
FIG. 23 is a schematic diagram of a control system for a wheeled vehicle including a hydraulic propulsion system, according to at least one illustrated embodiment.

FIG. 23 illustrates an electronic control system 452, which may be referred to as a "drive-by-wire" control system 452, through which an operator of a motor vehicle or other system powered by the hydraulic propulsion system 200 interacts with the hydraulic propulsion system 200. FIG. 23 illustrates that the control system 452 includes an engine control unit (sometimes referred to as an "ECU") 462, which comprises a central processing unit and/or other electronic components and circuitry for storing data, accepting signals from components of the hydraulic propulsion system 200 as input, processing the input signals and stored data to generate output signals, and transmitting the output signals to components of the hydraulic propulsion system 200.

The control system 452 also includes a pedal 430, which when actuated by an operator of the hydraulic propulsion system 200 generates and transmits a signal X to the ECU 462. The control system 452 also includes a manual lever 448, which when actuated by an operator of the hydraulic propulsion system 200 generates and transmits a signal to the ECU 462. In one embodiment, the signal may be a signal R to indicate that the operator desires the hydraulic propulsion system 200 to drive the wheels of the vehicle in reverse. In another embodiment, the signal may be a signal 2WD to indicate that the operator desires the hydraulic propulsion system 200 to drive only two wheels, such as with a single integrated hydraulic power and control unit 268. In still another embodiment, the signal may be a signal AWD to indicate that the operator desires the hydraulic propulsion system 200 to drive all four wheels, such as with two integrated hydraulic power and control units 268. In yet another embodiment, the signal may be a signal (Brake Energy Recovery System (BERS) to indicate that the operator desires the hydraulic propulsion system 200 to act as a brake energy recovery system, in which the hydraulic motors 208a-208d are inverted and operated as hydraulic pumps to extract energy from the wheels of the vehicle and store that energy as hydraulic energy in the accumulator unit 296. The control system 452 may also include a key 464, that when actuated by an operator of the hydraulic propulsion system 200, generates and transmits a signal to the ECU 462 indicating that the operator desires components of the hydraulic propulsion system 200, such as the thermal unit 202, to be started.

The control system 452 also includes a plurality of control wires 454, 456, 458, and 460 that electronically couple the ECU to four hydraulic motors 208 so that the ECU can transmit control signals to the hydraulic motors 208, and so that the hydraulic motors 208 can generate and transmit input signals, such as to signify the speed at which the hydraulic motors 208, or wheels coupled thereto, are moving (e.g., rotating). The control system 452 also includes a control wire 466 that electronically couples the ECU to the third flow control valve 262 so that the ECU can transmit control signals to the third flow control valve 262. The control system 452 further includes a control wire 468 that electronically couples the ECU to the fuel pump 450 so that the ECU can transmit control signals to the fuel pump 450. The control system 452 additionally includes a control wire 470 that electronically couples the ECU to the igniter 288 so that the ECU can transmit control signals to the igniter 288. Moreover, the control system 452 includes one or more control wires 472 that electronically couple the ECU to one or more additional flow control valves so that the ECU can transmit control signals to any of the other flow control valves described herein.

During a control algorithm or method for controlling the hydraulic propulsion system 200, when a wheeled vehicle or other system powered by the hydraulic propulsion system 200 is powered on, such as with the key 464, the system 200 performs an overall system check and a pressure check of the high-pressure accumulator 264 in particular. Then, when an operator indicates that the vehicle is about to be driven, such as by using the key 464, the system 200 opens the third flow control valve 262 to hydraulically open the accumulator unit 296 to a pair of integrated hydraulic power and control units 268 to allow the accumulator 296 to power operation of the vehicle's wheels. The system 200 also starts up the fuel pump 450 to pump fuel into the thermal unit 202, use the igniter 288 to ignite the fuel within the fuel pump 450, and begin actuating the first flow control valve 220 and/or the second flow control valve 222. In this manner, the system 200 provides power to the hydraulic cylinder 230 to induce resonance of the springs and pistons within the hydraulic cylinder 230 and to generate pressure waves as described above.

When the thermal unit 202 and the hydraulic cylinder 230 are powered up and the hydraulic energy stored in the accumulator unit 296 is no longer needed, the system 200 closes the third flow control valve 262 to hydraulically close the accumulator unit 296 off from the pair of integrated hydraulic power and control units 268, and uses the thermal unit 202 and the hydraulic cylinder 230 to power operation of the vehicle's wheels. The accumulator unit 296 is filled during such operation when the thermal unit 202 and the hydraulic cylinder 230 provide more power than needed to power the vehicle's wheels. When an operator of the vehicle actuates the pedal 430, signals are sent to the integrated hydraulic power and control units 268 to increase the speed of the vehicle. When the thermal unit 202 and the hydraulic cylinder 230 provide less power than needed to power the vehicle's wheels, the system uses the fuel pump 450 to pump additional fuel to the thermal unit 202 and opens the third flow control valve 262 to hydraulically open the accumulator unit 296 to the integrated hydraulic power and control units 268 to allow the accumulator 296 to provide additional power to the vehicle's wheels.

When the operator of the vehicle actuates a pedal or other physical control device, such as the manual lever 448, to indicate that the operator desires the vehicle to slow down and the hydraulic propulsion system 200 to act as a brake energy recovery system, the system 200 inverts the hydraulic motors 208a-208d, and uses them as hydraulic pumps to extract energy from the wheels of the vehicle, thereby slowing the vehicle, and stores that energy as hydraulic energy in the accumulator unit 296. When the wheeled vehicle or other system powered by the hydraulic propulsion system 200 is powered off, such as with the key 464, the system 200 keeps the thermal system 202 and the hydraulic cylinder 230 operating and stores the hydraulic energy generated by the thermal system 202 and the hydraulic cylinder 230 in the accumulator unit 296 until the accumulator unit 296 reaches its capacity. The thermal system 202 and the hydraulic cylinder 230 are then powered off.

FIGS. 24A and 24B illustrate energy transfers within the hydraulic propulsion system 200 at a conceptual level. In one implementation, FIG. 24A illustrates that the thermal unit 202 burns fuel, and thereby provides heat energy, at a relatively constant rate, and consistently converts that heat energy to hydraulic energy using a heat exchanger, at 474. The first and second flow control valves 220 and 222 and the hydraulic cylinder 230 then convert that hydraulic energy into pressure waves travelling through the hydraulic propulsion system 200, so that at least some of the energy is stored in the resonant vibrations of the components of the hydraulic cylinder 230 (as described above) at 476, and/or in the accumulator unit 296, at 478. This stored energy is then released to provide hydraulic propulsion, such as at one or more integrated hydraulic power and control units 268, at 480.

Thus, increased efficiency is achieved by using continuous combustion and conversion of thermal energy to hydraulic energy, and by transmitting power to the wheels of a vehicle hydraulically using hydraulic pressure waves. Further, increased flexibility is achieved by providing energy storage as described herein and releasing such stored energy when needed to meet the demands of the vehicle or the operator of the vehicle. Overall system efficiency is also improved by recovering energy when a wheeled vehicle is braking, as described herein. FIG. 24B illustrates some of these technological improvements of the hydraulic propulsion system 200, including that an output 482 of the thermal unit 202, which corresponds to the amount of energy added to storage, is relatively level, and that an amount of energy withdrawn from storage 484, which corresponds to an amount of energy provided to the hydraulic motors 208, is relatively highly variable to meet highly variable operating demands.

Figure 25:
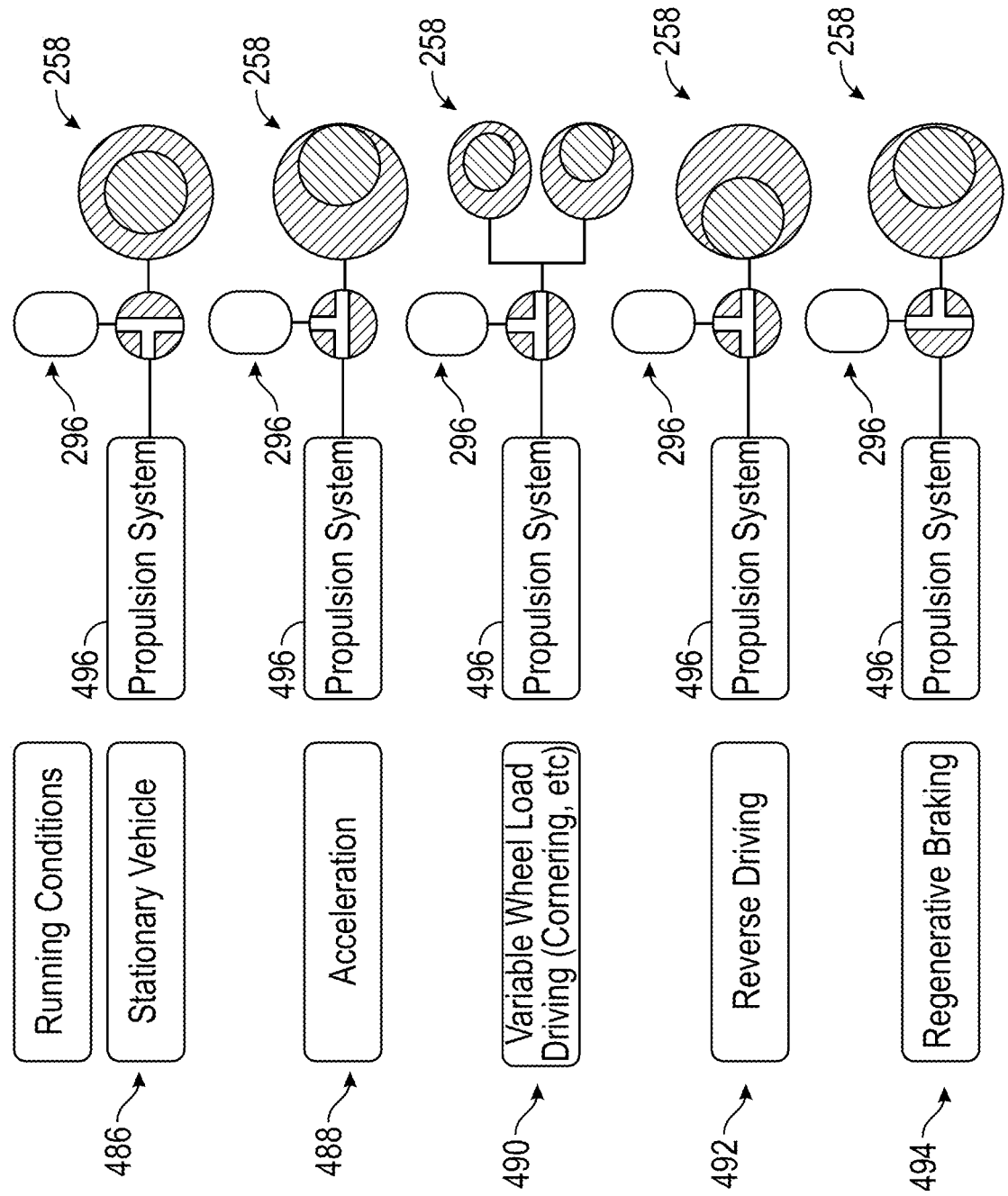
FIG. 25 illustrates positions of components of a hydraulic propulsion system at different stages of its operation, according to at least one illustrated embodiment.

FIG. 25 illustrates several components of the hydraulic propulsion system 200 at different operating stages of a wheeled vehicle. As illustrated in FIG. 25, when a vehicle is stationary at 486, the flow control valves described herein are arranged so that the propulsion system 496, including the thermal unit 202, the first and second flow control valves 220 and 222, and the hydraulic cylinder 230, provides hydraulic energy to the accumulator unit 296 and not to the hydraulic motors 208. When a vehicle is accelerating at 488, the flow control valves described herein are arranged so that the propulsion system 496 and the accumulator unit 296 provide hydraulic energy to the hydraulic motors 208. When a vehicle is experiencing variable demand at its individual wheels, such as when the vehicle is cornering, at 490, the flow control valves described herein are arranged so that the propulsion system 496 and the accumulator unit 296 provide hydraulic energy to the hydraulic motors 208, and the individual hydraulic motors 208 are actuated individually based on the respective demands.

When a vehicle is driving in reverse at 492, the flow control valves described herein are arranged so that the propulsion system 496 and the accumulator unit 296 provide hydraulic energy to the hydraulic motors 208, to run the hydraulic motors 208 in the opposite direction as when the vehicle is accelerating. When a vehicle is braking at 494, the flow control valves described herein are arranged so that the hydraulic motors 208 are inverted to operate as hydraulic pumps and as brakes for the vehicle, and to provide hydraulic energy to the accumulator unit 296.

Figure 26:
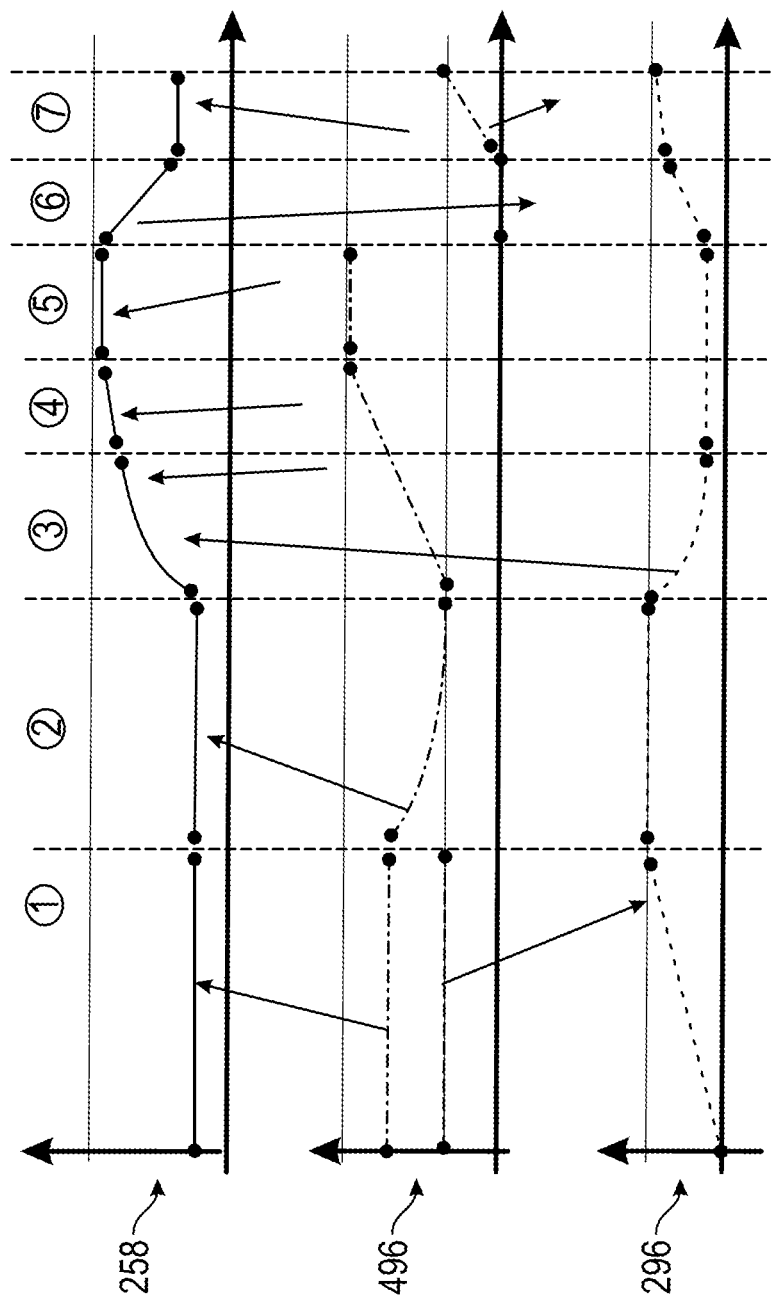
FIG. 26 illustrates energy transfers within a hydraulic propulsion system, according to at least one illustrated embodiment.

FIG. 26 illustrates energy transfers between system components, including the demand of the hydraulic motors 208, the output of the propulsion system 496, and the amount of energy stored in the accumulator unit 296, at different stages of operation of a wheeled vehicle. FIG. 26 illustrates that as a vehicle moves at a constant and relatively low speed, and the hydraulic motors 208 demand a constant level of power, the propulsion system 496 provides power to the hydraulic motors 208 and to the accumulator unit 296, until the accumulator unit 296 reaches its capacity, as indicated in stages 1 and 2 illustrated in FIG. 26. As the vehicle accelerates, as indicated in stages 3 and 4 illustrated in FIG. 26, the propulsion system 496 increases its power output and the accumulator provides additional power to meet the increased demand.

When the vehicle travels at a constant and relatively high speed, as indicated in stage 5 illustrated in FIG. 26, the propulsion system 496 operates at the increased power output level to meet the demand. When the vehicle is braking, as indicated in stage 6 illustrated in FIG. 26, the hydraulic motors 208 are inverted and operated as hydraulic pumps to provide hydraulic energy to the accumulator unit

296. When the vehicle then begins travelling at a constant, intermediate speed, as indicated in stage 7 illustrated in FIG. 26, the propulsion system 496 increases its power output to meet the increased demand, and once again provides any excess power to the accumulator unit 296.

Figure 27A:
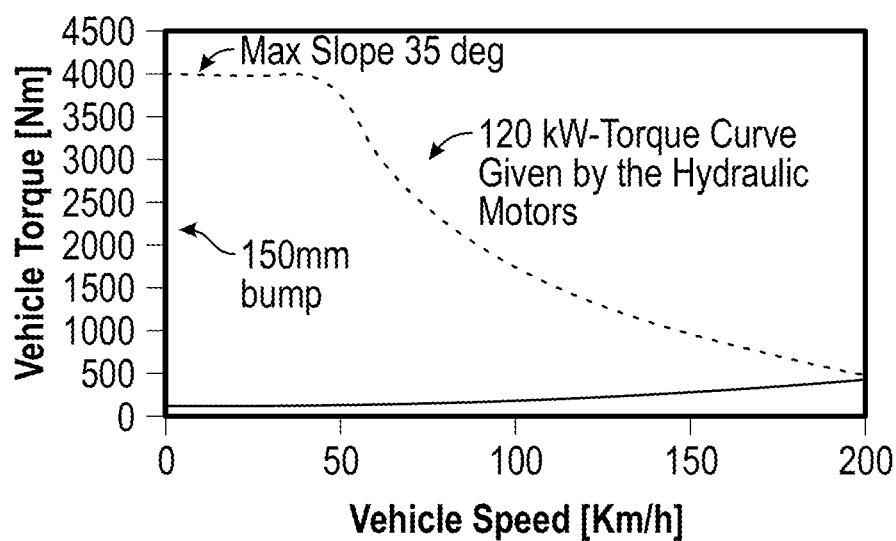
FIG. 27A illustrates results of analyses of the capabilities of a hydraulic propulsion system, according to at least one illustrated embodiment.
Figure 27B:
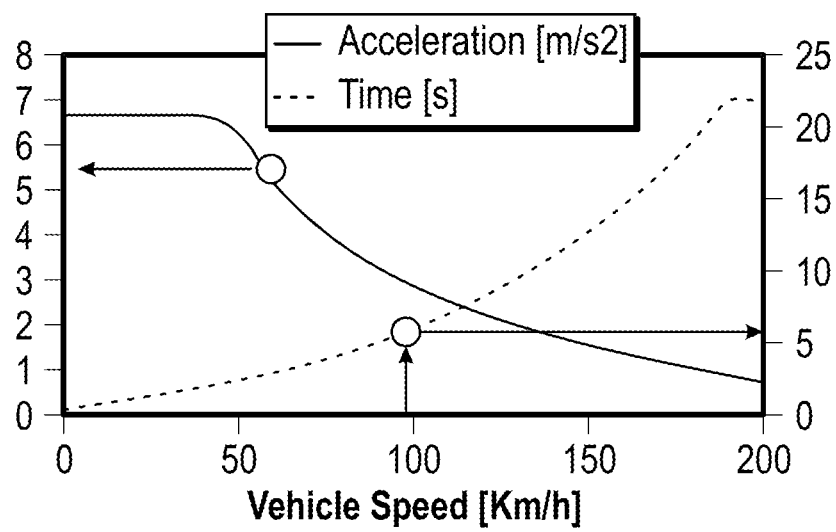
FIG. 27B illustrates results of analyses of the capabilities of a hydraulic propulsion system, according to at least one illustrated embodiment.

FIGS. 27A and 27B illustrate the results of several analyses of the efficiency and capabilities of the hydraulic propulsion system 200. Such analysis has shown that for 35 kW of total thermal energy produced by the thermal unit 202, 3 kW is expected to be lost through the housing 278 of the thermal unit 202, and 5 kW is expected to be lost through the exhaust from the thermal unit 202, with 27 kW transferred to the hydraulic fluid within the thermal unit 202. Of this 27 kW, such analysis has shown that about 1 kW is expected to be lost to hydraulic flow losses, about 1 kW is expected to be lost in the operation of the hydraulic motors 208, about 1 kW is expected to be used in the operation of the mechanical auxiliary systems actuator 424, 3 kW is expected to be used in the operation of the electrical generator unit 372, and about 2 kW is expected to be lost to other associated or auxiliary losses, with about 19 kW expected to be transferred to the wheels of the vehicle, for an overall efficiency of between 50%-60%.

Figure 28:
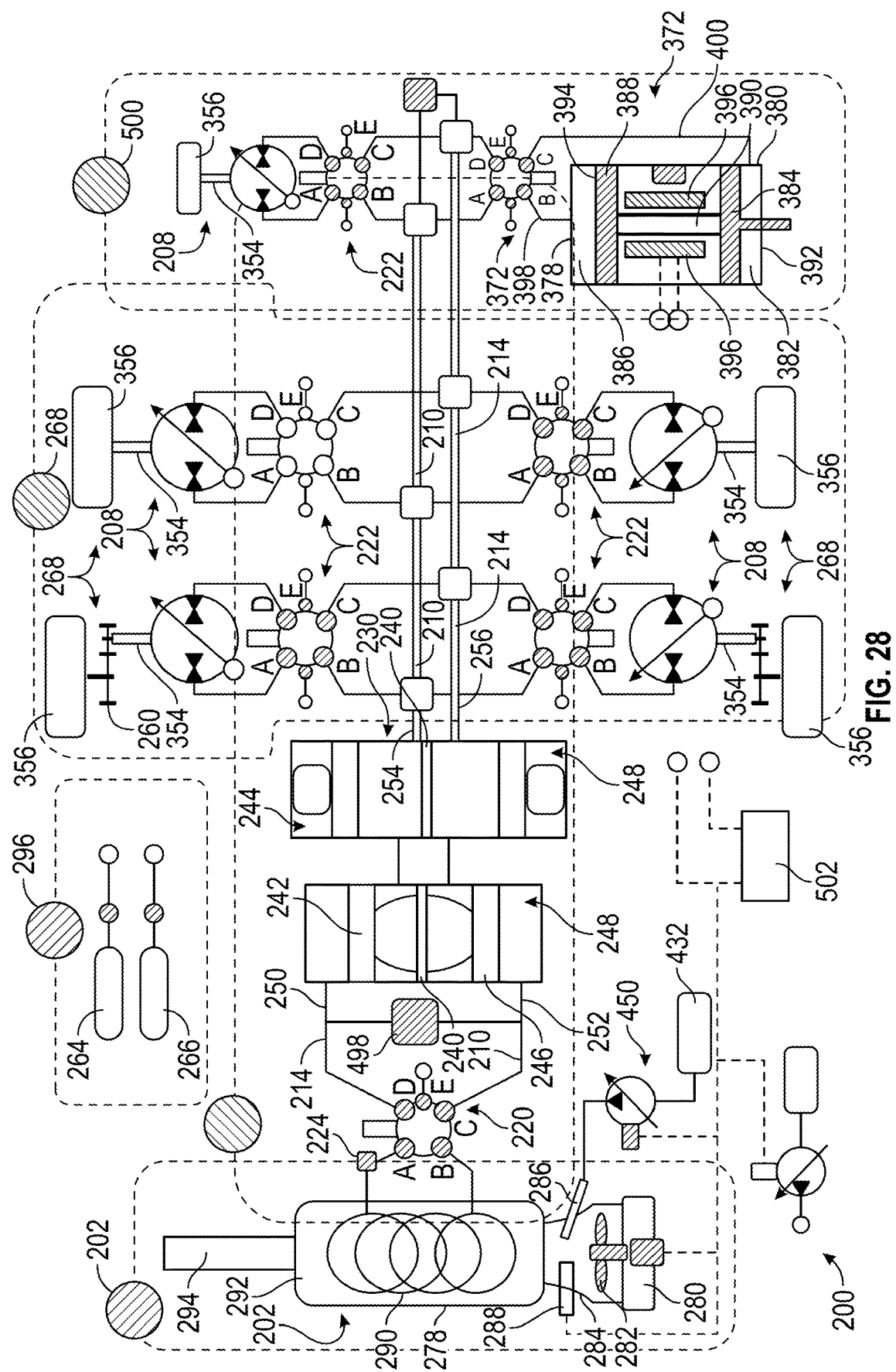
FIG. 28 is a schematic diagram of a hydraulic propulsion system, according to at least one illustrated embodiment.

FIG. 28 illustrates a schematic diagram of the hydraulic propulsion system 200, with some modifications to the implementations illustrated in the preceding figures, and formed in part of schematic diagrams previously illustrated, such as those of FIGS. 6C, 8B, 13B, and 20C. FIG. 28 illustrates that the hydraulic propulsion system 200 includes the thermal unit 202, as illustrated in FIG. 6C, coupled to the hydraulic cylinder 230 and components thereof, as illustrated in FIG. 8B, by the first flow control valve 220. FIG. 28 also illustrates that the hydraulic propulsion system 200 includes a double-sided pressure relief valve 498 coupled on one side to the first intermediate conduit 226 and on another side to the second intermediate conduit 228, to open a direct conduit between the first and second intermediate conduits 226 and 228 if the pressure therein, or the pressure differential therebetween, rises to higher than a threshold pressure or threshold pressure differential.

FIG. 28 also illustrates that the hydraulic propulsion system 200 includes two integrated hydraulic power and control units 268, as illustrated in FIG. 23B, coupled to the hydraulic cylinder 230 by respective second flow control valves 222. While FIG. 23B illustrates that both hydraulic motors 208 housed within a single integrated hydraulic power and control unit 268 are coupled to the hydraulic cylinder 230 by a common first dual rotational directional flow control valve 274, FIG. 28 illustrates that each hydraulic motor 208 is coupled to the hydraulic cylinder 230 by a single, respective flow control valve. FIG. 28 also illustrates that one or both of the integrated hydraulic power and control units 268 include a gearbox 260 mounted between the respective output shafts 354 and the respective wheels 356, to allow an operator of the wheeled vehicle to further control the speed and power of the wheels 356.

FIG. 28 also illustrates that the hydraulic propulsion system 200 includes an auxiliary systems power unit 500, which includes the auxiliary systems actuator 424 and the electrical generator unit 372, as illustrated in FIG. 20C, and which are used to power auxiliary systems of a wheeled vehicle, such as an electrical alternator, a power steering pump, and/or an air conditioning compressor. FIG. 28 also illustrates that the hydraulic propulsion system 200 includes the accumulator unit 296, including the high pressure accumulator 264 and the low pressure accumulator 266, and which are coupled to the hydraulic cylinder 230 by the second and/or third flow control valves 222, 262. FIG. 28 also illustrates that the hydraulic propulsion system 200 includes the fuel pump 450 arranged to pump fuel from the fuel tank 432 to the fuel injector 286 of the thermal unit 202. FIG. 28 also illustrates that the hydraulic propulsion system 200 includes a battery 502, which is coupled to and charged by the electrical generator unit 372, and which is coupled to, and used to actuate, components of the fuel pump 450, the fan 282 of the thermal unit 202, the igniter 288 of the thermal unit 202, and/or any or all of the hydraulic motors 208 and/or flow control valves described herein.

SUMMARY

Figure 29:
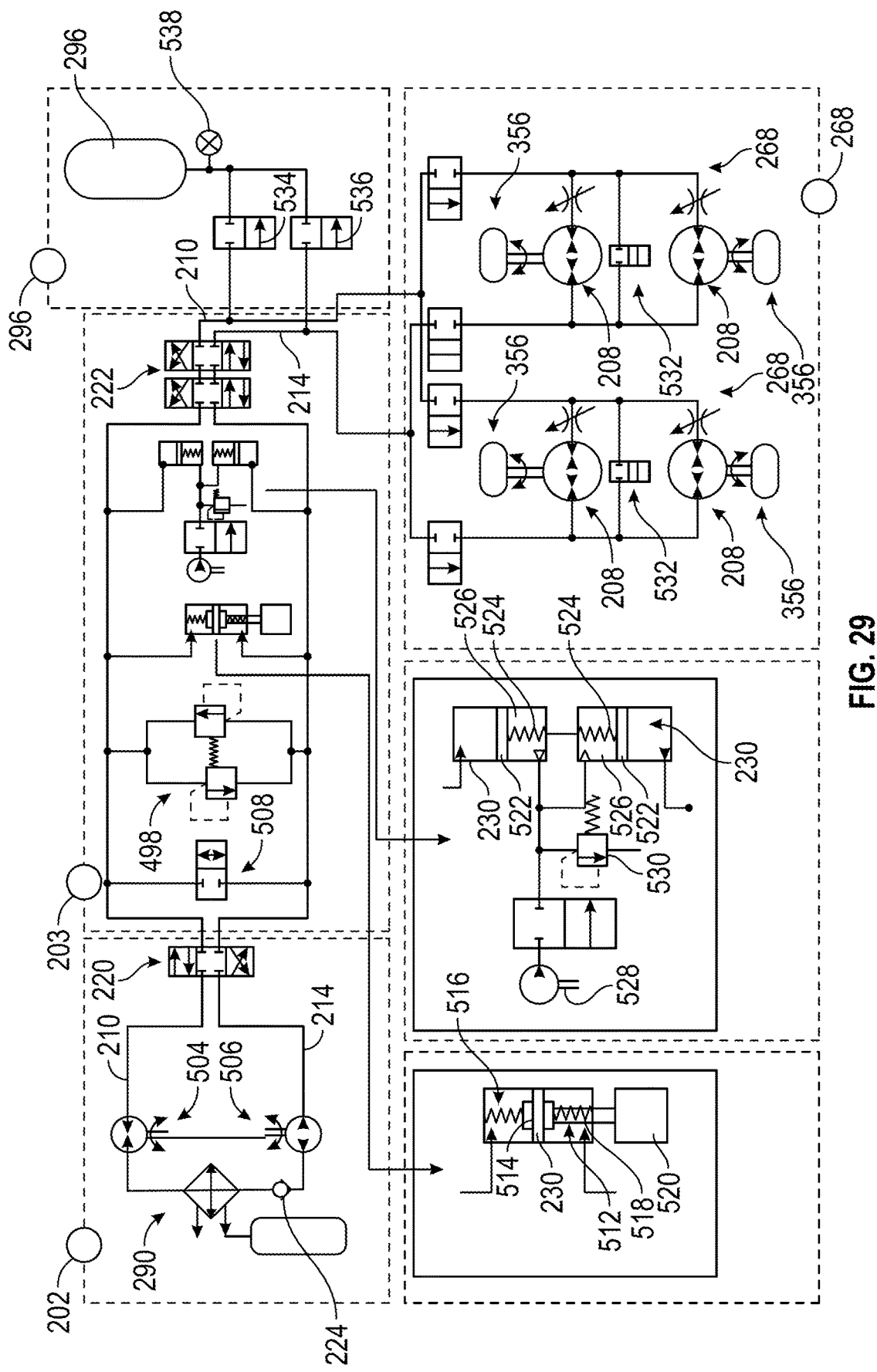
FIG. 29 is a schematic diagram of a hydraulic propulsion system, according to at least one illustrated embodiment.

FIG. 29 illustrates another schematic diagram of the hydraulic propulsion system 200, with some modifications to the implementations illustrated in the preceding figures. Specifically, FIG. 29 illustrates that the hydraulic propulsion system 200 includes a hydraulic motor 504 that is actuated by passing high-pressure waves to induce a hydraulic pump 506 to pump hydraulic fluid from the second hydraulic conduit 214 into the thermal unit 202. FIG. 29 also illustrates that the hydraulic propulsion system 200 includes a flow control valve 508, which is used to ensure that components coupled to the hydraulic conduits thereof are at the same pressure. Additionally, FIG. 29 illustrates that the hydraulic propulsion system 200 includes a hydraulic cylinder 230 and a piston assembly 512 similar to that illustrated in FIG. 4, with an additional mass 520 coupled to the piston 514. The hydraulic cylinder 230 and the piston assembly 514 provide the system 200 with sonic inertia.

Furthermore, FIG. 29 illustrates that the hydraulic propulsion system 200 includes additional hydraulic cylinders 230 that each house a respective piston 522 coupled to an end of the hydraulic cylinder 230 by a respective spring 524. Respective chambers 526 within each of the hydraulic cylinders 230 that are hydraulically separated from the rest of the hydraulic propulsion system 200 by the pistons 522 are coupled to one another and to a hydraulic compressor 528 and to a pressure reduction valve 530, which controls the pressure within the chambers 526 and provides the system 200 with sonic capacity.

FIG. 29 also illustrates that the hydraulic propulsion system 200 includes four hydraulic motors 208, each coupled to a respective wheel 356 of a wheeled vehicle. Further, FIG. 29 illustrates that each of the hydraulic motors 208 is coupled in parallel with the other hydraulic motors 208, including by incorporating bypass valves 532 between pairs of hydraulic motors 208, so that each of the wheels 356 is powered and rotates independently of the other wheels 356. FIG. 29 additionally illustrates that the accumulator unit 296 is hydraulically coupled to the rest of the hydraulic propulsion system 200 by a first flow control valve 534, which can be opened to allow high-pressure fluid to flow into or out of the accumulator unit 296 while the vehicle is moving forward, and a second control valve 536, which can be opened to allow high-pressure fluid to flow into or out of the accumulator unit 296 while the vehicle is moving backward. The filling and emptying of the accumulator unit 296 is monitored in part by using a pressure gauge 538.

Figure 30:
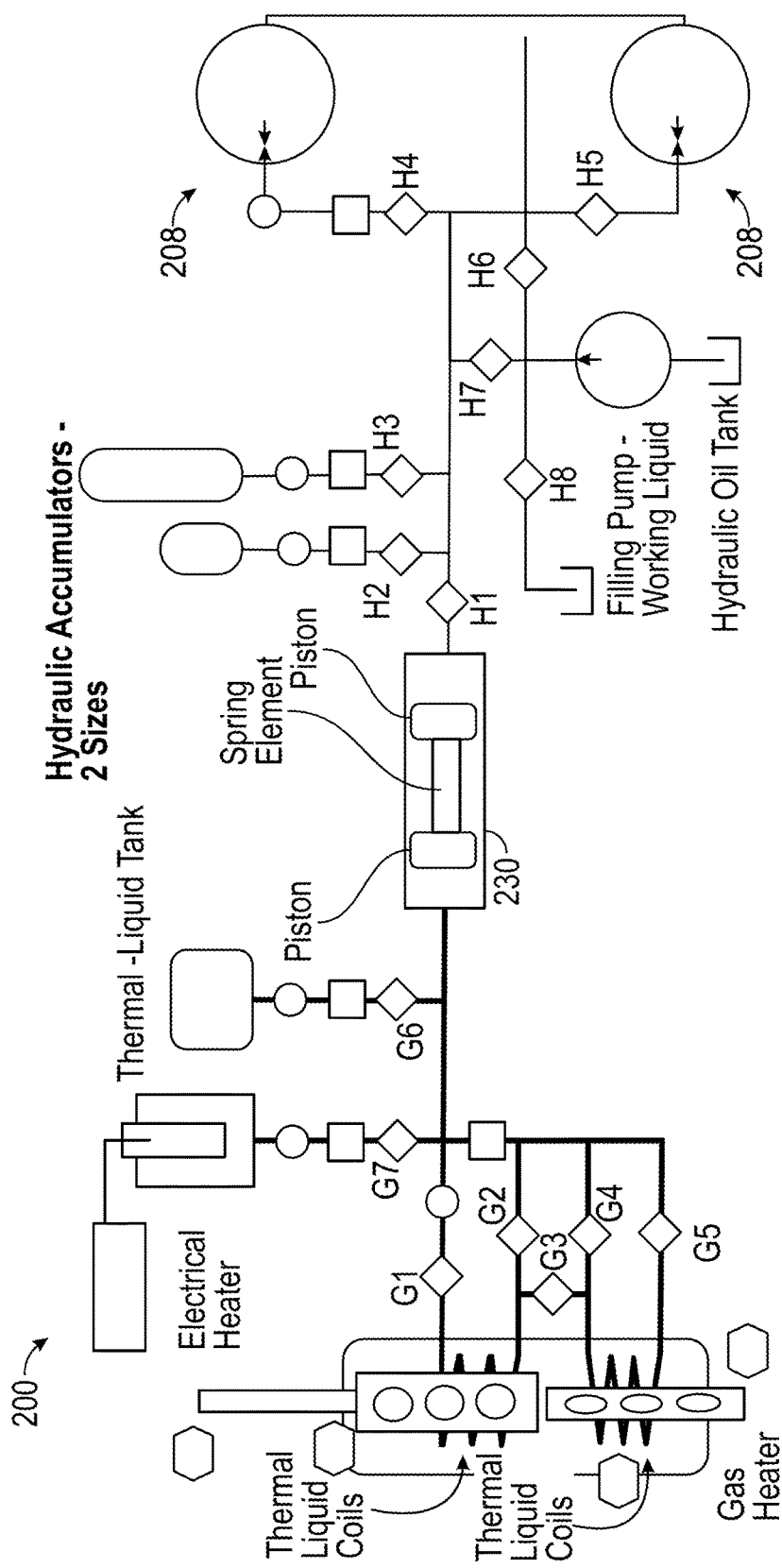
FIG. 30 is a schematic diagram of a hydraulic propulsion system, according to at least one illustrated embodiment.

FIG. 30 illustrates another schematic diagram of the hydraulic propulsion system 200, with some modifications to the implementations illustrated in the preceding figures. Specifically, FIG. 30 illustrates that the hydraulic propulsion system 200 includes a first plurality of flow control valves G1, G2, G3, G4, G5, G6, and G7, on a first side of the hydraulic cylinder 230, for controlling the flow of a dilating hydraulic fluid, and a second plurality of flow control valves H1, H2, H3, H4, H5, H6, H7, and H8, on a second side of the hydraulic cylinder 230, for controlling the flow of a working hydraulic fluid, wherein each of the flow control valves is indicated by a diamond. FIG. 30 illustrates that the hydraulic propulsion system 200 also includes a plurality of air breathers, indicated by circles, a plurality of pressure transducers, indicated by squares, and a plurality of pressure transducers, indicated by hexagons.

U.S. Provisional Patent Application Nos. 62/496,784, filed Oct. 28, 2016, 62/498,336, filed Dec. 21, 2016, 62/498,337, filed Dec. 21, 2016, 62/498,347, filed Dec. 21, 2016, 62/498,338, filed Dec. 21, 2016, and 62/577,630, filed Oct. 26, 2017, as well as U.S. Non-Provisional patent application Ser. No. 15/731,360, filed Jun. 1, 2017, and Romanian Patent Application No. A/10070/2017 filed Oct. 27, 2017, are hereby incorporated herein by reference, in their entireties.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A thermal hydraulic propulsion system, comprising:
a thermal unit including a heat exchanger thermally coupled to a heat source and to a first conduit carrying a dilating hydraulic fluid, wherein the heat exchanger exchanges heat between the heat source and the dilating hydraulic fluid, the first conduit having a first inlet and a first outlet; and
an integrated hydraulic power and control unit including a hydraulic motor hydraulically coupled to a mechanical device and to a second conduit carrying a working hydraulic fluid that is different than the dilating hydraulic fluid, wherein the hydraulic motor transfers hydraulic energy from the working hydraulic fluid to mechanical power of the mechanical device, the second conduit having a second inlet and a second outlet.

2. The propulsion system of claim 1, further comprising:
a sonic transmission unit including:
a first intermediate conduit having a third inlet and a third outlet;
a second intermediate conduit having a fourth inlet and a fourth outlet;
a sonic wave generator including a first flow control valve having a first position that hydraulically couples the first outlet to the third inlet and the first inlet to the fourth outlet, and the first flow control valve having a second position that hydraulically couples the first outlet to the fourth outlet and the first inlet to the third inlet; and
a sonic wave converter valve including a second flow control valve having a first position that hydraulically couples the second outlet to the fourth inlet and the second inlet to the third outlet, and the second flow control valve having a second position that hydraulically couples the second outlet to the third outlet and the second inlet to the fourth inlet.

3. The propulsion system of claim 2, wherein the first flow control valve is locked to the second flow control valve so that the first and second flow control valves are either both in their respective first positions or both in their respective second positions.

4. The propulsion system of claim 2, wherein the mechanical device is a wheel, wherein the propulsion system further comprises a second hydraulic motor hydraulically coupled to a second wheel and to the second conduit, a third hydraulic motor hydraulically coupled to a third wheel and to the second conduit, and a fourth hydraulic motor hydraulically coupled to a fourth wheel and to the second conduit.

5. The propulsion system of claim 2, wherein the dilating hydraulic fluid has a first coefficient of thermal expansion and the working hydraulic fluid has a second coefficient of thermal expansion that is lower than the first coefficient of thermal expansion.

6. The propulsion system of claim 2, further comprising a hydraulic accumulator hydraulically coupled to the second conduit.

7. The propulsion system of claim 2, further comprising an electrical energy generator hydraulically coupled to the second conduit.

8. The propulsion system of claim 2, further comprising:
a hydraulic cylinder having a first end coupled to the first intermediate conduit and a second end opposite the first end coupled to the second intermediate conduit.

9. The propulsion system of claim 8, further comprising:
a dividing wall that divides the hydraulic cylinder into a first chamber and a second chamber;
a first piston positioned to move within the first chamber; and
a second piston positioned to move within the second chamber.

10. The propulsion system of claim 9, wherein the first piston separates the dilating hydraulic fluid from the working hydraulic fluid in the first chamber and the second piston separates the dilating hydraulic fluid from the working hydraulic fluid in the second chamber.

11. The propulsion system of claim 9, further comprising:
a first spring coupled to the dividing wall and to the first piston; and
a second spring coupled to the dividing wall and to the second piston.

12. A wheeled vehicle including the propulsion system of claim 1 wherein the mechanical device is a wheel of the wheeled vehicle.

13. The wheeled vehicle of claim 12, wherein the wheeled vehicle is an automobile, an all-terrain vehicle, or a heavy machinery vehicle.

14. A method of operating a thermal hydraulic pressure wave-based propulsion system, comprising:
using a thermal unit to heat a dilating hydraulic fluid within a first conduit coupled to a sonic wave generator, the sonic wave generator including a first flow control valve in a closed position to increase pressure of the dilating hydraulic fluid in the first conduit;
actuating a sonic transmission unit including the sonic wave generator, the actuating of the sonic transmission unit including actuating the first flow control valve to move from the closed position to an open position to generate a pressure wave in a working hydraulic fluid within a second conduit; and
using the pressure wave in the working hydraulic fluid to provide energy to an integrated hydraulic power and control unit including a hydraulic motor.

15. The method of claim 14, wherein the hydraulic motor drives a first wheel, the method further comprising using the pressure wave to drive a second hydraulic motor and a second wheel, a third hydraulic motor and a third wheel, and a fourth hydraulic motor and a fourth wheel.

16. The method of claim 14, wherein the dilating hydraulic fluid has a first coefficient of thermal expansion and the working hydraulic fluid has a second coefficient of thermal expansion that is lower than the first coefficient of thermal expansion.

17. The method of claim 14, further comprising using the pressure wave in the working hydraulic fluid to provide energy to a hydraulic accumulator.

18. The method of claim 14, further comprising using the pressure wave to provide energy to an electrical energy generator.

19. The method of claim 14, further comprising using the pressure wave to move a piston within a hydraulic cylinder.

20. The method of claim 19, wherein moving the piston within the hydraulic cylinder includes compressing a spring within the hydraulic cylinder.

21. The method of claim 20, wherein moving the piston within the hydraulic cylinder and compressing the spring within the hydraulic cylinder includes oscillating the piston and the spring within the hydraulic cylinder.

22. The method of claim 21, wherein oscillating the piston and the spring within the hydraulic cylinder includes oscillating the piston and the spring in resonance within the hydraulic cylinder.

23. The method of claim 19, wherein the piston separates the dilating hydraulic fluid from the working hydraulic fluid.

24. A thermo-hydraulic gravitational energy conversion system, comprising:
a hydraulic tank hydraulically coupled to a hydraulic pump, the hydraulic pump hydraulically coupled to a check valve, the check valve hydraulically coupled to a first hydraulic valve, the first hydraulic valve hydraulically coupled to a first hydraulic cylinder and to a second hydraulic valve, the first hydraulic cylinder housing a first piston and a first spring, the second hydraulic valve hydraulically coupled to a third hydraulic valve and a fourth hydraulic valve, the third hydraulic valve hydraulically coupled to a second hydraulic cylinder and to a fifth hydraulic valve, the second hydraulic cylinder housing a second piston that supports a weight, the fifth hydraulic valve hydraulically coupled to a heat exchanger, the fourth hydraulic valve hydraulically coupled to a hydraulic motor and to a third hydraulic cylinder, the third hydraulic cylinder housing a third piston and a second spring, the third piston mechanically coupled to a rod, the rod mechanically coupled by a rotational joint to a lever, the lever mechanically coupled to a freewheel, the freewheel mechanically coupled to a shaft.

* * * * *